US012573766B2

(12) United States Patent
Johnston et al.

(10) Patent No.: US 12,573,766 B2
(45) Date of Patent: Mar. 10, 2026

(54) PATTERNED ARTICLE INCLUDING METALLIC BODIES

(71) Applicant: 3M INNOVATIVE PROPERTIES COMPANY, St. Paul, MN (US)

(72) Inventors: Raymond P. Johnston, Lake Elmo, MN (US); John J. Sullivan, Hudson, WI (US); Matthew C. Messina, Maplewood, MN (US); Charles D. Hoyle, Stillwater, MN (US); Jaewon Kim, Woodbury, MN (US); Haiyan Zhang, Lake Elmo, MN (US); Kevin W. Gotrik, Hudson, WI (US); Douglas S. Dunn, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/059,151

(22) PCT Filed: Jun. 10, 2021

(86) PCT No.: PCT/IB2021/055128

§ 371 (c)(1),
(2) Date: Nov. 28, 2022

(87) PCT Pub. No.: WO2021/255594

PCT Pub. Date: Dec. 23, 2021

(65) Prior Publication Data

US 2024/0235055 A1 Jul. 11, 2024

Related U.S. Application Data

(60) Provisional application No. 63/150,847, filed on Feb. 18, 2021, provisional application No. 63/039,552, filed on Jun. 16, 2020.

(51) Int. Cl.
*H01Q 21/00* (2006.01)
*H01Q 21/06* (2006.01)

(52) U.S. Cl.
CPC ....... *H01Q 21/0093* (2013.01); *H01Q 21/061* (2013.01)

(58) Field of Classification Search
USPC .......................................................... 343/824
See application file for complete search history.

(56) References Cited

U.S. PATENT DOCUMENTS 4,990,827 A 2/1991 Ehrfeld et al.
5,369,881 A * 12/1994 Inaba .................... H05K 3/045 228/180.1

(Continued)

FOREIGN PATENT DOCUMENTS

CN 100460028 C 2/2009
CN 100576410 C 12/2009

(Continued)

OTHER PUBLICATIONS

International Search Report for PCT International Application No. PCT/IB2021/055128, mailed on Aug. 31, 2021, 4 pages.

(Continued)

*Primary Examiner* — Dimary S Lopez Cruz
*Assistant Examiner* — Brandon Sean Woods
(74) *Attorney, Agent, or Firm* — Clifton F. Richardson

(57) ABSTRACT

A patterned article includes a polymeric layer having opposing first and second major surfaces and defining a plurality of through openings therein. For each through opening in at least a sub-plurality of the through openings, a metallic body is disposed in the through opening. The metallic body has a first outermost surface, an opposite second outermost surface and at least one lateral sidewall extending therebetween. The first outermost surface of the metallic body is (Continued)

substantially flush with the first major surface of the polymeric layer. Each lateral sidewall extends from the first outermost surface of the metallic body toward or to, but not past, the second major surface of the polymeric layer. The metallic body is substantially coextensive with the through opening in at least one cross-section parallel to the polymeric layer. The metallic bodies can be electrically isolated from one another.

20 Claims, 24 Drawing Sheets

(56) References Cited

U.S. PATENT DOCUMENTS

| | | | | |
|---|---|---|---|---|
| 5,760,434 | A | 6/1998 | Zahurak et al. | |
| 5,868,952 | A | 2/1999 | Hatakeyama et al. | |
| 6,400,018 | B2 | 6/2002 | Clatanoff et al. | |
| 6,531,332 | B1 | 3/2003 | Shkel et al. | |
| 6,767,614 | B1 | 7/2004 | Hofmann et al. | |
| 6,929,849 | B2 | 8/2005 | Koskenmaki et al. | |
| 8,415,771 | B1 | 4/2013 | Golda et al. | |
| 9,780,438 | B2 | 10/2017 | Kuehler et al. | |
| 9,804,607 | B1 | 10/2017 | Coleman | |
| 2002/0012248 | A1 | 1/2002 | Campbell et al. | |
| 2002/0154590 | A1 | 10/2002 | Vezenov et al. | |
| 2003/0027081 | A1 | 2/2003 | Chua et al. | |
| 2003/0049563 | A1 | 3/2003 | Iida et al. | |
| 2003/0064265 | A1 | 4/2003 | Hampden-Smith et al. | |
| 2003/0183008 | A1 | 10/2003 | Bang et al. | |
| 2004/0213962 | A1 | 10/2004 | Bourdelais | |
| 2005/0067286 | A1 | 3/2005 | Ahn et al. | |
| 2005/0079333 | A1 | 4/2005 | Wheatley et al. | |
| 2006/0087602 | A1 | 4/2006 | Kunisada et al. | |
| 2006/0132531 | A1 | 6/2006 | Fitch et al. | |
| 2007/0148815 | A1 | 6/2007 | Chao et al. | |
| 2008/0063866 | A1 | 3/2008 | Allen et al. | |
| 2008/0095988 | A1 | 4/2008 | Frey et al. | |
| 2008/0099860 | A1 | 5/2008 | Wuertz | |
| 2008/0307849 | A1 | 12/2008 | Lim et al. | |
| 2009/0051620 | A1 | 2/2009 | Ishibashi et al. | |
| 2009/0219257 | A1 | 9/2009 | Frey et al. | |
| 2009/0303125 | A1 | 12/2009 | Caille et al. | |
| 2010/0103521 | A1 | 4/2010 | Smith et al. | |
| 2010/0316852 | A1 | 12/2010 | Condo et al. | |
| 2012/0245445 | A1 | 9/2012 | Black et al. | |
| 2013/0171687 | A1 | 7/2013 | Moularat et al. | |
| 2013/0264390 | A1 | 10/2013 | Frey et al. | |
| 2014/0057058 | A1 | 2/2014 | Yapel et al. | |
| 2014/0152579 | A1 | 6/2014 | Frey | |
| 2014/0204294 | A1 | 7/2014 | Lv | |
| 2014/0308477 | A1 | 10/2014 | Derks et al. | |
| 2014/0353397 | A1 | 12/2014 | Velásquez-Garcia et al. | |
| 2015/0064628 | A1 | 3/2015 | Guo | |
| 2015/0085460 | A1 | 3/2015 | Frey | |
| 2015/0109674 | A1 | 4/2015 | Cok | |
| 2015/0138151 | A1 | 5/2015 | Moran et al. | |
| 2015/0285956 | A1 | 10/2015 | Schmidt et al. | |
| 2016/0131615 | A1 | 5/2016 | Sun et al. | |
| 2016/0170101 | A1 | 6/2016 | Kivel et al. | |
| 2017/0248741 | A1 | 8/2017 | Hao et al. | |
| 2018/0007819 | A1 | 1/2018 | Vajo et al. | |
| 2018/0139842 | A1 | 5/2018 | Xu | |
| 2019/0029111 | A1 * | 1/2019 | Matsuoka | C25D 5/022 |
| 2019/0066571 | A1 | 2/2019 | Goward | |

FOREIGN PATENT DOCUMENTS

| | | | | | |
|---|---|---|---|---|---|
| CN | 101354404 | B | | 12/2010 | |
| CN | 101899185 | A | | 12/2010 | |
| CN | 102063951 | B | | 7/2013 | |
| CN | 102820528 | B | | 5/2015 | |
| CN | 103322505 | B | | 11/2016 | |
| CN | 106374197 | A | | 2/2017 | |
| CN | 104893601 | B | | 5/2017 | |
| CN | 106449565 | B | | 5/2019 | |
| EP | 1622435 | A1 | | 2/2006 | |
| EP | 2463957 | A1 | * | 6/2012 | H01Q 19/32 |
| EP | 2463957 | B1 | | 10/2019 | |
| JP | 07307565 | A | | 11/1995 | |
| JP | 10126041 | A | | 5/1998 | |
| JP | 2006084673 | A | * | 3/2006 | |
| JP | 2012019205 | A | | 1/2012 | |
| JP | 2013161951 | A | * | 8/2013 | |
| JP | 2015030127 | A | * | 2/2015 | |
| KR | 20120095945 | | * | 8/2012 | |
| WO | 1994018697 | A1 | | 8/1994 | |
| WO | 1995014314 | A1 | | 5/1995 | |
| WO | 1996015450 | A1 | | 5/1996 | |
| WO | 1997045854 | A1 | | 12/1997 | |
| WO | 1997046882 | A1 | | 12/1997 | |
| WO | 1999047922 | A2 | | 9/1999 | |
| WO | 2000065124 | A1 | | 11/2000 | |
| WO | 2001009579 | A1 | | 2/2001 | |
| WO | 2001071410 | A2 | | 9/2001 | |
| WO | 2001088612 | A1 | | 11/2001 | |
| WO | 2001097235 | A1 | | 12/2001 | |
| WO | 2003050852 | A2 | | 6/2003 | |
| WO | 2004101857 | A2 | | 11/2004 | |
| WO | 2005023391 | A2 | | 3/2005 | |
| WO | 2005035144 | A1 | | 4/2005 | |
| WO | 2005052650 | A2 | | 6/2005 | |
| WO | 2005122285 | A2 | | 12/2005 | |
| WO | 2006020610 | A2 | | 2/2006 | |
| WO | 2006065387 | A1 | | 6/2006 | |
| WO | 2006094641 | A1 | | 9/2006 | |
| WO | 2006125224 | A2 | | 11/2006 | |
| WO | 2006129633 | A1 | | 12/2006 | |
| WO | 2007001977 | A2 | | 1/2007 | |
| WO | 2007028595 | A2 | | 3/2007 | |
| WO | 2007045294 | A1 | | 4/2007 | |
| WO | 2007142809 | A2 | | 12/2007 | |
| WO | 2008045814 | A2 | | 4/2008 | |
| WO | 2008066965 | A2 | | 6/2008 | |
| WO | 2008131304 | A1 | | 10/2008 | |
| WO | 2009004560 | A2 | | 1/2009 | |
| WO | 2009069350 | A1 | | 6/2009 | |
| WO | 2009115230 | A2 | | 9/2009 | |
| WO | 2009136873 | A2 | | 11/2009 | |
| WO | 2009154812 | A2 | | 12/2009 | |
| WO | 2010009364 | A1 | | 1/2010 | |
| WO | 2010033281 | A2 | | 3/2010 | |
| WO | 2010043889 | A1 | | 4/2010 | |
| WO | 2010111387 | A1 | | 9/2010 | |
| WO | 2010132613 | A2 | | 11/2010 | |
| WO | 2011066529 | A2 | | 6/2011 | |
| WO | 2011068907 | A1 | | 6/2011 | |
| WO | 2011116388 | A1 | | 9/2011 | |
| WO | 2014066454 | A1 | | 5/2014 | |
| WO | 2014085069 | A1 | | 6/2014 | |
| WO | WO-2014164257 | A1 | * | 10/2014 | G02B 26/02 |
| WO | 2015021080 | A2 | | 2/2015 | |
| WO | 2015045596 | A1 | | 4/2015 | |
| WO | 2015126248 | A1 | | 8/2015 | |
| WO | 2015153907 | A1 | | 10/2015 | |
| WO | 2015176023 | A1 | | 11/2015 | |
| WO | 2015177589 | A1 | | 11/2015 | |
| WO | 2015193434 | A2 | | 12/2015 | |
| WO | 2016028766 | A1 | | 2/2016 | |
| WO | 2016145077 | A1 | | 9/2016 | |
| WO | 2017145706 | A1 | | 8/2017 | |
| WO | 2020031450 | A1 | | 2/2020 | |
| WO | 2020225731 | A1 | | 11/2020 | |

OTHER PUBLICATIONS

Li, "The Rise of Conductive Copper Inks: Challenges and Perspectives", Applied Materials Today, 2019, pp. 1-26.

* cited by examiner

PATTERNED ARTICLE INCLUDING METALLIC BODIES

CROSS REFERENCE TO RELATED APPLICATIONS

This application is a national stage filing under 35 U.S.C. 371 of PCT/IB2021/055128, filed Jun. 10, 2021, which claims the benefit of U.S. Application No. 63/039,552, filed Jun. 16, 2020, and U.S. Application No. 63/150,847, filed Feb. 18, 2021, the disclosures of which are incorporated by reference in their entirety herein.

BACKGROUND

An article useful as an antenna, EMI shield, or touch sensor may include a micropattern of metallic traces formed on a substrate by photolithography.

SUMMARY

The present disclosure relates generally to patterned articles that include metallic bodies. The metallic bodies may be electrically isolated from one another or a conductive layer may be included that electrically connects the metallic bodies.

In some aspects of the present description, a patterned article including a polymeric layer having opposing first and second major surfaces and defining a plurality of through openings therein is provided. For each through opening in at least a first sub-plurality of the through openings, a metallic body is disposed in the through opening. The metallic body has a first outermost surface, an opposite second outermost surface and at least one lateral sidewall extending therebetween. The first outermost surface of the metallic body is substantially flush with the first major surface of the polymeric layer. Each lateral sidewall extends from the first outermost surface of the metallic body toward or to, but not past, the second major surface of the polymeric layer. The metallic body can be substantially coextensive with the through opening in at least one cross-section parallel to the polymeric layer. The metallic bodies can be electrically isolated from one another.

In some aspects of the present description, a patterned article including a polymeric layer including a structured first major surface and an opposing second major surface and defining a plurality of through openings therein is provided. For each through opening in at least a first sub-plurality of the through openings, a metallic body is disposed in the through opening. The metallic body has a first outermost surface adjacent the first major surface of the polymeric layer, an opposite second outermost surface, and at least one lateral sidewall extending therebetween. Each lateral sidewall extends from the first outermost surface of the metallic body toward or to, but not past, the second major surface of the polymeric layer. The metallic body can be substantially coextensive with the through opening in at least one cross-section parallel to the polymeric layer. The metallic bodies can be electrically isolated from one another.

In some aspects of the present description, a patterned article including a unitary polymeric layer disposed on a conductive layer is provided. The unitary polymeric layer includes a first major surface facing the conductive layer and an opposing second major surface. The unitary polymeric layer defines a plurality of through openings therein. For each through opening in at least a first sub-plurality of the through openings, a unitary metallic body is disposed in the through opening. The unitary metallic body includes a least one lateral sidewall extending between opposing outermost major surfaces of the unitary metallic body. Each lateral sidewall extends from the conductive layer toward or to, but not past, the second major surface of the unitary polymeric layer. The unitary metallic body can be substantially coextensive with the through opening in at least one cross-section parallel to the unitary polymeric layer. The unitary metallic body can fill at least 10% of a volume of the through opening.

In some aspects of the present description, a process for making a patterned article is provided. The process includes, in sequence: providing a conductive layer; forming a polymeric layer on the conductive layer where the polymeric layer defines a plurality of through openings therein: depositing a metallic body in each through opening in at least a first sub-plurality of the through openings such that the metallic body contacts the conductive layer: and optionally removing the conductive layer resulting in the metallic bodies being electrically isolated from one another.

These and other aspects will be apparent from the following detailed description. In no event, however, should this brief summary be construed to limit the claimable subject matter.

DETAILED DESCRIPTION

Figure 1A:
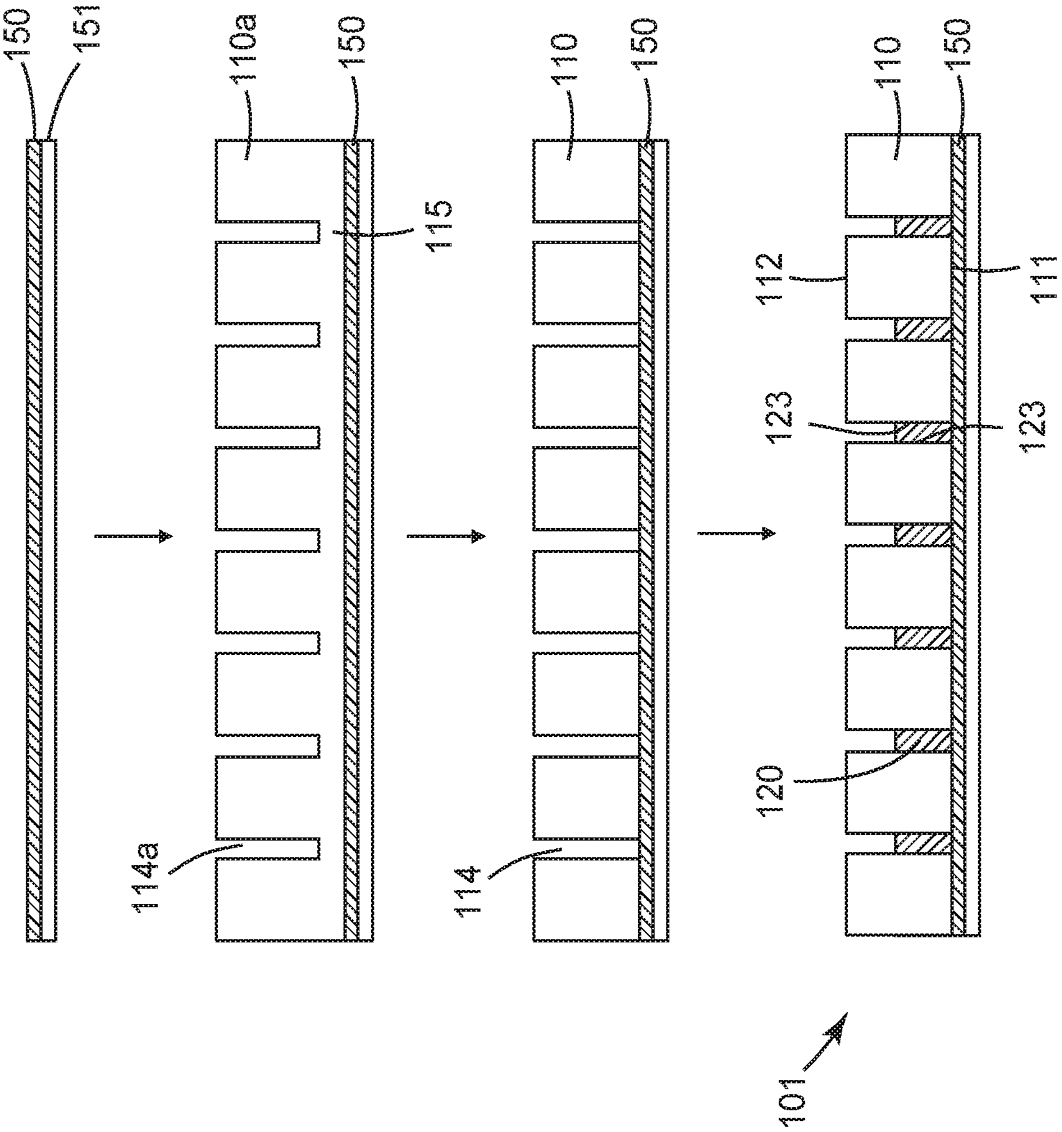
FIG. 1A is a schematic illustration of steps in an illustrative process for making a patterned article.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, a patterned article includes metallic bodies that are electrically isolated from one another. In other embodiments, a patterned article includes metallic bodies electrically connected to one another only by virtue of a single conductive layer. The metallic bodies can be arranged to provide any suitable functionality. For example, in some embodiments, the metallic bodies define an antenna (see, e.g., FIGS. 10A-10C and 12) which can be or include an antenna array such as a retrodirective antenna array, for example. Still other examples include an electromagnetic interference (EMI) shield, an electrostatic dissipation component, a heater, an electrode, or a sensor. The devices may be provided as an array of the devices which can be subsequently singulated to provide individual devices.

In some embodiments, the metallic bodies are patterned. For example, a metallic body can include or be formed from a micropattern of metallic traces (e.g., the traces can have a width that is at least 100 nm and less than 1 mm). In some embodiments, at least some (e.g., at least a majority, or in some cases, all) of the metallic bodies include a micropattern of metallic traces. Using a micropattern of metallic traces can result in a high optical transparency of the patterned article which may be desired in some applications. In other embodiments, the metallic bodies are formed from nonpatterned metal and may have a low optical transparency.

Conductive elements, such as those including a micropattern of conductive traces, may be formed on a substrate using photolithography processes. According to some aspects of the present description, processes have been developed which allow electrically conductive elements (e.g., metallic bodies) to be formed at least partially within a substrate without utilizing photolithography. In some embodiments, the processes described herein are less expensive and/or more easily implemented than traditional photolithography processes. In some embodiments, the processes allow traces, for example, having a large (e.g., at least 0.8) aspect ratio (thickness divided by width) to be formed. A large aspect ratio may be desired for applications where a high transparency and a high electrical conductance is desired. For example, increasing the open area fraction can increase the transparency but would lower the electrical conductance for a fixed trace thickness. The traces can then be made thicker to increase the electrical conductance, which can lead to a high aspect ratio. In some embodiments, the patterned article may be used at relatively high operating frequencies (e.g., the patterned article may be an antenna designed to operate at microwave frequencies) where the skin depth of the material of the traces is smaller than the width of the traces, for example. Using a high aspect ratio increases the surface area of the traces for a given trace width and this increases the conductor usage (and therefore increases the electrical conductance at the operating frequencies) compared to lower aspect ratio traces (e.g., those conventionally formed by lithography or printing) of the same trace width.

It has traditionally been difficult to form metallic bodies on a substrate by electroplating when the metallic bodies are electrically isolated from one another due to the difficulty of providing a common temporary ground in this case. According to some embodiments of the present description, the traces or metallic bodies are formed by plating on a conductive layer (e.g., electroplating on the conductive layer) disposed on bottoms of through openings in a substrate (e.g., a polymeric layer). The conductive layer can provide a substantially common potential (e.g., a temporary ground plane) for electroplating and can be removed after plating resulting in electrically isolated metallic bodies. Plating onto a conductive layer disposed on the bottom, but not on the sidewalls, of the through openings has been found to provide improved control over the profile of the trace or metallic body compared to plating into a cavity, for example, where a conductive layer is on the bottom of the cavity and also on the side walls. For example, if the conductive layer were on the sidewalls, plating can result in metal being formed on upper portions of the conductive layer on the side walls which can result in over deposition of the metal on the top surface of the substrate past the edge of the cavity or through opening. Such over deposition can be problematic for patterned articles made by traditional processes, especially when a high aspect ratio is desired since this can, for example, lower the optical transmission through the patterned article.

A conductive member (e.g., body, layer, trace, element, or material) means an electrically conductive member, unless indicated otherwise. A conductive member may have an electrical resistivity less than 1 ohm·m, or less than 0.01 ohm·m, or less than $10^{-4}$ ohm·m, or less than $10^{-6}$ ohm·m, for example. Non-conductive material refers to electrically non-conductive material, unless indicated differently. A non-conductive material may have an electrical resistivity greater than 100 ohm·m, or greater than $10^{4}$ ohm·m, or greater than $10^{6}$ ohm·m, or greater than $10^{8}$ ohm·m, for example. Electrical resistivity refers to the direct current (DC) resistivity, unless indicated differently.

Spatially related terms, including but not limited to, "bottom", "lower", "upper", "beneath", "below", "above," "top", and "on top," if used herein, are utilized for case of description to describe spatial relationships. Such spatially related terms encompass different orientations of the article in use or operation in addition to the particular orientations depicted in the figures and described herein.

Figure 1B:
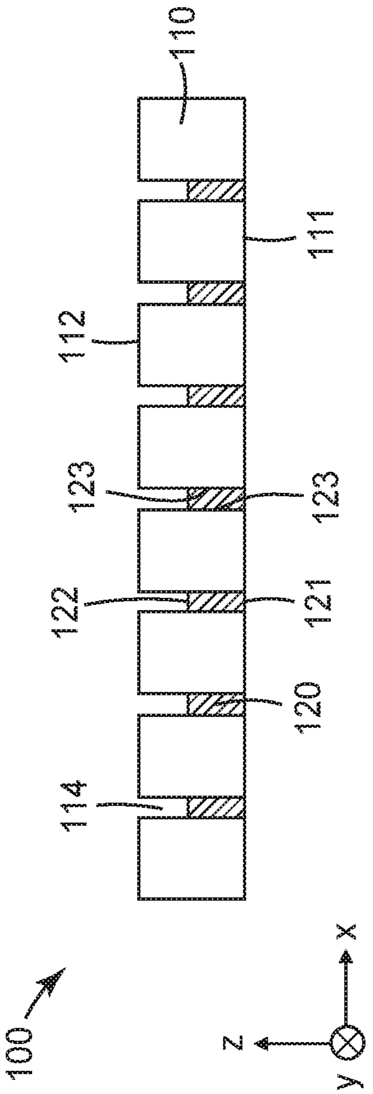
FIGS. 1B-1C are schematic cross-sectional views of illustrative articles that can be made by the process of FIG. 1A.
Figure 1C:
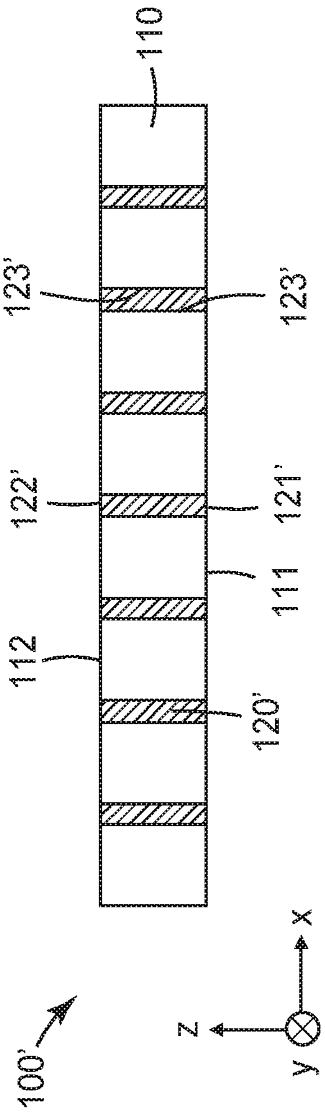

FIG. 1A is a schematic illustration of steps in a process for making a patterned article 101, 100, or 100', according to some embodiments. FIGS. 1B-1C are schematic cross-sectional views of illustrative articles that can be made by the process of FIG. 1A. The process includes, in sequence: providing a conductive layer 150; forming a polymeric layer 110 on the conductive layer 150, where the polymeric layer 110 defines a plurality of through openings 114 therein; depositing a metallic body 120 in each through opening in at least a first sub-plurality of the through openings such that the metallic body 120 contacts the conductive layer 150; and optionally removing the conductive layer 150 resulting in the metallic bodies 120 being electrically isolated from one another. A sub-plurality of through openings, for example, is at least two through openings but less than all of the through openings. The phrase, "at least a sub-plurality of through openings" encompasses both a sub-plurality of the through openings and the entire plurality of through openings. In FIGS. 1A-1C, a metallic body is disposed in each through opening. Embodiments in which metallic bodies are disposed in a first sub-plurality of through openings, but not in a second sub-plurality of through openings are schematically illustrated in FIGS. 5A to 7C, for example. The conductive layer 150 can be optionally disposed on a substrate 151. The conductive layer 150 provides a substantially common potential surface (e.g., a ground plane) onto which the metallic bodies 120 can be deposited by electroplating, for example. In embodiments where the patterned article 100 or 100' is desired, the conductive layer 150 can be removed from the polymeric layer 110 by peeling or by etching, for example. An additional layer or film can optionally be laminated to the surface 112 of the polymeric layer 110 to aid in peeling the conductive layer 150 from the article. In embodiments where the patterned article 101 is desired, the conductive layer 150, and optionally the substrate 151, can be retained. The metallic body 120 can partially fill the through openings 114 as schematically illustrated in FIGS. 1A-1B, or the metallic body 120 can fill the through openings 114 as schematically illustrated in FIG. 1C, or a portion of the metallic body 120 can extend past the surface 112 as schematically illustrated in FIG. 1D, whether or not the conductive layer 150 is retained.

In some embodiments, a patterned article 101 includes a (e.g., unitary) polymeric layer 110 disposed on a conductive layer 150 where the polymeric layer 110 includes a first major surface 111 facing the conductive layer 150 and an opposing second major surface 112. The polymeric layer defines a plurality of through openings 114 therein. For each through opening in at least a first sub-plurality of the through openings, a (e.g., unitary) metallic body 120 is disposed in the through opening where the metallic body 120 includes a least one lateral sidewall 123 extending between opposing outermost surfaces 121, 122 of the metallic body 120. Each lateral sidewall 123 extends from the conductive layer 150 toward or to, but not past, the second major surface 112 of the polymeric layer 110. The metallic body 120 can be coextensive or substantially coextensive with the through opening 114 in at least one cross-section parallel to the polymeric layer 110, as described further elsewhere. In some embodiments, the metallic bodies 120 are electrically connected to one another only by virtue of the conductive layer 150. In other words, if the conductive layer 150 were removed, the metallic bodies 120 would be electrically isolated from one another. The lateral sidewall(s) are sidewall(s) on a lateral side (a side along a direction orthogonal to the thickness direction of the patterned article such as a direction in the x-y plane) of the metallic bodies 120 while the outermost surfaces 121, 122 can be bottom and top surfaces (surfaces having smallest and largest values of the z-coordinate or surfaces at opposite ends along the thickness direction of the patterned article), respectively, of the metallic bodies 120.

A unitary layer or body is a layer or body composed of a single continuous layer. A unitary layer or body does not have adjacent layers or adjacent sections separated by an interface. A unitary layer or body may alternatively be referred to as a monolithic layer or body. In some embodiments, a metallic body is a unitary metallic body. In other embodiments, the metallic body may be nonunitary. In some embodiments, a polymeric layer is a unitary polymeric layer. In other embodiments, the polymeric layer may be nonunitary. Any of the metallic bodies described herein may be a unitary metallic body except where stated otherwise or where the context clearly indicates differently. Any of the polymeric layers described herein may be a unitary polymeric layer except where stated otherwise or where the context clearly indicates differently. In some embodiments, a metallic body in a through opening includes a unitary metallic body and one or more metallic layers disposed on the unitary metallic body, as described further elsewhere herein.

Figure 3A:
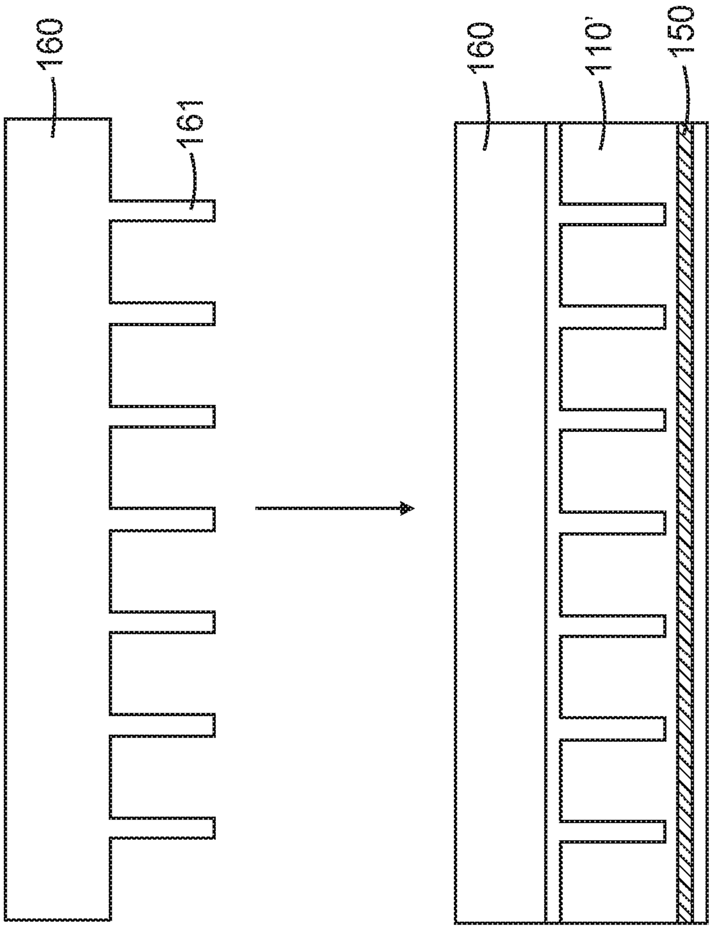
FIG. 3A is a schematic illustration of an illustrative tool and an illustrative method of forming a polymeric layer.
Figure 3B:
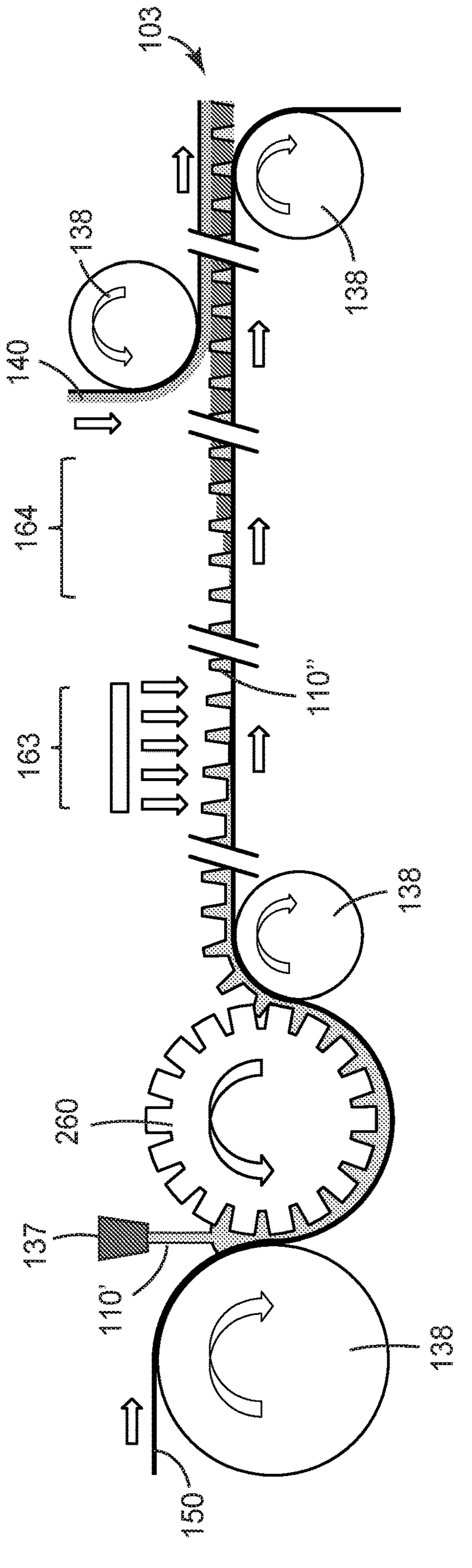
FIG. 3B is a schematic illustration of a continuous process for making a patterned article.

In some embodiments, as described further elsewhere herein, forming the polymeric layer 110 includes disposing a resin between a structured tool (see, e.g., structured tools 160 and 260 schematically illustrated in FIGS. 3A-3B) and the conductive layer 150 and curing or hardening the resin. In some embodiments, curing or hardening the resin results in a plurality of partial-through openings 114*a* corresponding to the plurality of through openings 114, and the process further includes etching (e.g., plasma etching) the cured or hardened resin 110*a* to remove a portion 115 of the cured or hardened resin 110*a* adjacent the conductive layer 150 in the partial-through openings 114*a*. The etching may also remove top portions of the cured or hardened resin 110*a* resulting in a reduced thickness to the polymeric layer 110. The portions 115 may be referred to as land portions.

In some embodiments, forming the polymeric layer 110 includes compression molding a polymer. For example, the tool 160 or 260 describe elsewhere can be used in compression molding a polymer. A subsequent etching step may be used to remove portions (e.g., corresponding to portions 115) of the compression molded polymer adjacent the conductive layer 150.

FIGS. 1B-1C are schematic cross-sectional views of patterned articles 100 and 100", according to some embodiments. The patterned article 100 (resp., 100') includes a polymeric layer 110 including opposing first and second major surfaces 111 and 112 and defining a plurality of through openings 114 therein. For each through opening 114 in at least a first sub-plurality of the through openings, a metallic body 120 (resp., 120') is disposed in the through opening 114. The metallic body 120 (resp., 120') has a first outermost surface 121 (resp., 121'), an opposite second outermost surface 122 (resp., 122') and at least one lateral sidewall 123 (resp., 123) extending therebetween. The first outermost surface 121 (resp., 121') of the metallic body 120 (resp., 120") is substantially flush (e.g., nominally flush or flush to within about 20% or within about 10% or within about 5% of the smaller of a thickness of the polymeric layer and a smallest diameter or width of the metallic body) with the first major surface 111 of the polymeric layer 110. Each lateral sidewall 123 (resp., 123') extends from the first outermost surface 121 (resp., 121') of the metallic body 120 (resp., 120') toward or to, but not past, the second major surface 112 of the polymeric layer 110. As described further elsewhere (see, e.g., FIG. 9), the metallic body 120 (resp., 120') can be coextensive or substantially coextensive with the through opening 114 in at least one cross-section parallel to the polymeric layer (e.g., parallel to the x-y plane). In some embodiments, the metallic bodies 120 (resp., 120') are electrically isolated from one another. In the embodiment of FIG. 1B, the sidewall(s) 123 of the metallic bodies 120 extends toward, but not to, the second major surface 112. In the embodiment of FIG. 1C, the sidewall(s) 123' of the metallic bodies 120' extends to, but not past, the second major surface 112. The metallic bodies 120 (resp., 120') may include a single lateral sidewall 123 (resp., 123') along a perimeter of the metallic bodies (e.g., a single sidewall of a cylindrical metallic body), or may include two lateral sidewalls 123 (resp., 123) (e.g., opposing sidewalls of a metallic body disposed in a groove) or may include more lateral sidewalls 123 (resp., 123') (e.g., four sidewalls of a metallic body having a square or rectangular cross-section).

In some embodiments, the metallic bodies 120, 120' are electrically isolated from one another. For example, the polymeric layer 110 can be electrically non-conductive such that the metallic bodies 120, 120' are electrically isolated. In some embodiments, the metallic bodies 120, 120' are electrically isolated from the first and second major surfaces 111 and 112 of the polymeric layer 110. That is, the metallic bodies 120, 120' may be electrically isolated from any conductive element(s) disposed on either of the first and second major surfaces 111 and 112.

In some embodiments, for each metallic body in at least a majority of the metallic bodies, the second outermost surface 122 of the metallic body 120 is disposed between the first and second major surfaces 111 and 112 of the polymeric layer 110.

In some embodiments, for each metallic body in at least a majority of the metallic bodies, the second outermost surface 122' of the metallic body 120' is substantially flush with the second major surface 112 of the polymeric layer 110.

In some embodiments, a portion of the metallic body extends above the second major surface of the polymeric layer. FIG. 1D is a schematic cross-sectional view of a portion of a patterned article, according to some embodiments, illustrating a metallic body 120" having a first outermost surface 121" substantially flush with the first major surface 111 of the polymeric layer 110 and a second outermost surface 122" disposed at least partially outside the polymeric layer 110. In the illustrated embodiment, lateral sidewall(s) 123" extend from the first outermost surface 121" of the metallic body 120" substantially to the second major surface 112 of the polymeric layer 110.

Figure 1E:
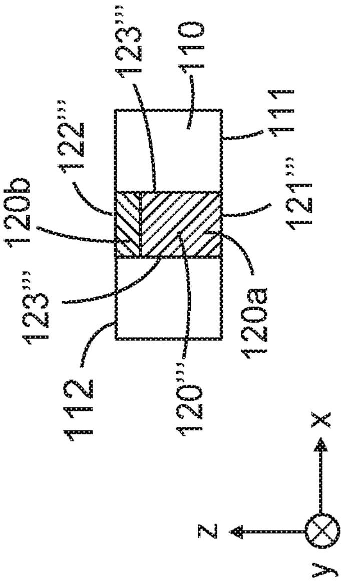
FIG. 1E is a schematic cross-sectional view of a portion of another illustrative patterned article.
Figure 1D:
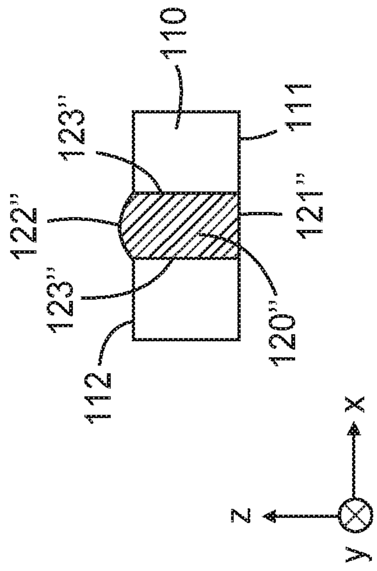
FIG. 1D is a schematic cross-sectional view of a portion of an illustrative patterned article.

FIG. 1E is a schematic cross-sectional view of a portion of a patterned article, according to some embodiments, illustrating a metallic body 120'" having a first outermost surface 121'" substantially flush with the first major surface 111 of the polymeric layer 110 and a second outermost surface 122" which may be substantially flush with the second major surface 112 as illustrated, or may be between the first and second major surfaces 111 and 112 as illustrated in FIG. 1B, for example, or may be disposed at least partially outside the polymeric layer 110 as illustrated in FIG. 1D, for example. In the illustrated embodiment, lateral sidewall(s) 123'" of the metallic body 120'" extend from the first outermost surface 121'" of the metallic body 120'" substantially to the second major surface 112 of the polymeric layer 110. The metallic body 120'" includes a unitary metallic body **120*a* which includes the first outermost surface 121'" and includes one or more metallic layers 120*b* which includes second outermost surface 122'". Unitary metallic body 120*a* has sidewalls extending from the first outermost surface 121'" (or from a conductive layer 150 in embodiments where the conductive layer 150 is present) toward, but not to, the second major surface of the unitary polymeric layer. In some embodiments, the volume of the unitary metallic body 120*a* is at least 50%, or at least 60%, or at least 70%, or at least 80% of the volume of the metallic body 120'". The one or more metallic layers 120*b* may be included so that the metallic body 120'" has a specific color to "hide" the conductor for cosmetic reasons. For example, the one or more layers 120*b* can provide a black color, or in some graphics applications the one or more layers 120*b*** can provide a white color to blend in with the graphic.

In some embodiments, the metallic body (e.g., a unitary metallic body **120*a* or a metallic body 120'" including one or more metallic layers 120*b* disposed on a unitary metallic body 120*a***) in a through opening fills at least 10%, or at least 30%, or at least 50%, or at least 70%, or at least 80% of a volume of the through opening. For example, the metallic body can fill from 10% to 100% or from 30% to 80% of the volume of the through opening.

In some embodiments, the patterned article (e.g., 101, 100, 100') further includes a dielectric layer disposed on the second major surface of the polymeric layer and covering the metallic bodies. In some such embodiments, or in other embodiments, the metallic bodies are electrically isolated from the second major surface of the polymeric layer. In some such embodiments, or in other embodiments, the patterned article further includes a dielectric layer disposed on the first major surface of the polymeric layer and covering the metallic bodies. In some such embodiments, or in other embodiments, the metallic bodies are electrically isolated from the first major surface of the polymeric layer. A dielectric layer is an electrically non-conductive layer having a dielectric constant (relative permittivity) higher than that of air for at least one frequency (e.g., an operating frequency of the patterned article and/or a fixed reference frequency such as 1 GHZ). For example, the dielectric constant can be at least 1.1 or at least 1.2 or at least 1.5 at 1 GHz.

Figure 2A:
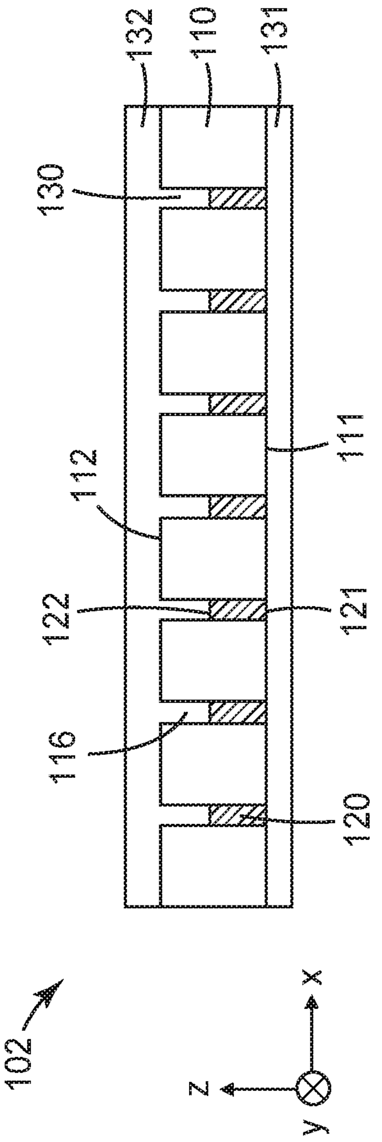
FIGS. 2A-2B are schematic cross-sectional views of illustrative patterned articles.
Figure 2B:
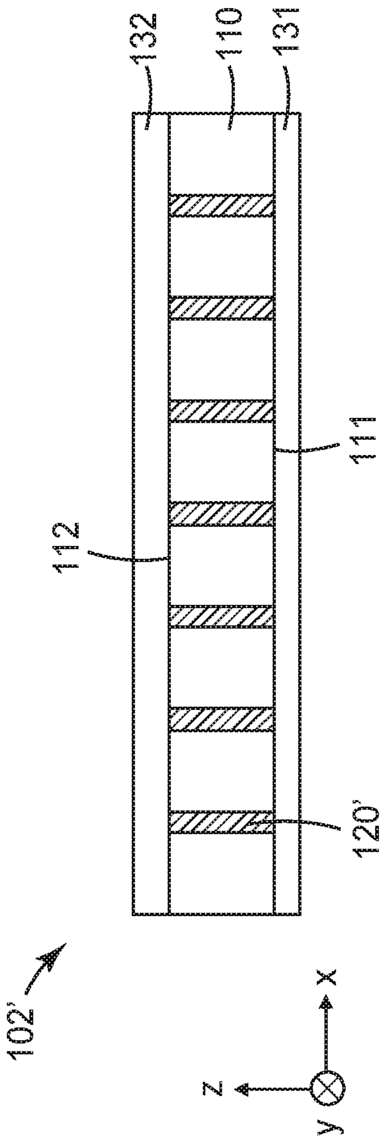

FIGS. 2A-2B are schematic cross-sectional views of patterned articles 102 and 102", respectively, according to some embodiments. The patterned articles 102 and 102' can correspond to patterned articles 100 and 100', respectively, except that the patterned articles 102 and 102" include a first dielectric layer 131 disposed on the first major surface 111 of the polymeric layer 110 and a second dielectric layer 132 disposed on the second major surface 112 of the polymeric layer 110. In some embodiments, one of the first and second dielectric layers 131 and 132 is omitted. For example, the second dielectric layer 132 can be included on the second major surface 112 of the polymeric layer 110 in patterned articles 101, but the conductive layer 150 may be retained and the first dielectric layer 131 can be omitted. In some embodiments, the patterned article 102 (resp., 102') includes a dielectric layer 132 disposed on the second major surface 112 of the polymeric layer 110 and covering the metallic bodies 120 (resp., 120'). In some such embodiments, or in other embodiments, the patterned article 102 (resp., 102') includes a dielectric layer 131 disposed on the first major surface 111 of the polymeric layer 110 and covering the metallic bodies 120 (resp., 120').

The dielectric layers 131 and/or 132 can be polymeric (e.g., a polymeric encapsulant). In embodiments where the second dielectric layer 132 is included, the second dielectric layer 132 can be added to the article at any time after the metallic bodies 120, 120', 120" are formed. For example, the second dielectric layer 132 may be added before or after the conductive layer 150 is removed. In some embodiments, the dielectric layer 132 partially fills the through openings 114.

In some embodiments, for each metallic body in the majority of the metallic bodies and for each corresponding through opening, a portion 116 of the through opening between the second outermost surface 122 of the metallic body 120 and the second major surface 112 of the polymeric layer 110 is at least partially filled with a material 130, which may be a polymeric material. An additional film can be disposed on one or both sides of the polymeric layer 110, as described further elsewhere.

The conductive layer 150 can be a metallic foil such as a copper or aluminum foil, for example. In some embodiments, the metallic bodies are formed from a first metal and the conductive layer 150 is formed from a second metal having a different composition from the first metal. For example, the metallic bodies 120 can be copper bodies while the conductive layer 150 can be an aluminum layer. In embodiments where the metallic bodies 120 are plated onto the conductive layer 150, utilizing different metals can result in a relatively low adhesion of the metallic bodies 120 to the conductive layer 150 allowing the conductive layer 150 to be readily peeled from the patterned article.

Any suitable metal can be used for the metallic bodies. Suitable materials for the metallic bodies include elemental metals such as copper or silver, for example. Suitable materials for the dielectric layer(s) include polymers such as radiation cured polymers and/or encapsulant materials, for example. Suitable encapsulant materials include silicone encapsulants, epoxy encapsulants, urethane encapsulants, and fluoropolymers, for example. Fluoropolymers have low dielectric loss at high frequencies and may be preferred for some applications. The dielectric layers can be applied by coating and subsequently curing the coated material, for example. Any suitable polymeric material can be used for the polymeric layer 110. Suitable materials for the polymeric layer 110 are described further elsewhere.

FIG. 3A is a schematic illustration of forming a polymeric layer by disposing a resin 110", which may be or include polymer(s) or polymer precursor(s), between a structured tool 160 and the conductive layer 150. The resin 110' is then cured, or otherwise hardened, to form the cured or hardened resin 110*a* of the layer 110 (see, e.g., FIG. 1A). The structured tool 160 includes structures 161. The structures 161 may have a taper so that the tool can be easily removed from the resin (see, e.g., FIG. 11B schematically illustrating a tapered feature that may be made from a tapered structure of a structured tool). In embodiments where the structures 161 has a width that is at least 100 nm and less than 1 mm, for example, the process of replicating the structured surface (or a negative of the structured surface) of the tool 160 may be referred to as microreplication. The tool 160 can be made via diamond turning, laser machining, photolithography, or additive deposition (e.g., 2 photon or digital printing), for example. The tool may be a metal tool or may be a polymer tool formed from a metal tool (e.g., by compression molding the polymer against the metal tool), for example. A polymer tool can be transparent to allow curing through the tool.

The tool 160 may alternatively be a generally cylindrical tool and a roll-to-roll process can be used to make the polymeric layer using the cylindrical tool. This is schematically illustrated in FIG. 3B. A structured tool 260, which may correspond to structured tool 160 except for having a generally cylindrical shape, is used in a continuous process for making a patterned article 103 which may correspond to article 100', for example, except for the additional layer or film 140. In the illustrated embodiment, rollers 138 are provided to guide the various layers and films through the process. A polymeric layer 110" (e.g., corresponding to layer 110) is formed by extruding a resin 110' from an extruder 137 between a conductive layer 150 and a structured tool 260 (alternatively the layer 110" could be formed by casting and curing a resin against a structured tool) and then plasma etching (at etching station 163 in the illustrated embodiment) to remove land portions (e.g., corresponding to portions 115). Next, metallic bodies are deposited in through openings in the polymeric layer 110 by electroplating (at plating station 164 in the illustrated embodiment). Next, a layer or film 140 is laminated to the resulting article and then the conductive layer 150 is removed by peeling the layer away. In other embodiments, the layer or film 140 may be omitted and/or the conductive layer 150 may be retained.

In some embodiments, the process includes disposing a polymer or polymer precursor (e.g., corresponding to resin 110') onto the structured tool 160 and solidifying the polymer or polymer precursor to form a polymeric layer (e.g., layer 110, 110"). In some embodiments, the polymer or polymer precursor is or includes a molten or thermally softened polymer and solidifying the polymer or polymer precursor includes cooling the molten or thermally softened polymer. For example, the polymer or polymer precursor may be a thermoplastic resin (e.g., polyethylene terephthalate, polypropylene, polycarbonate, or other thermoplastic resins known in the art) softened by applying heat and applied as a melt (or embossed or otherwise structured) that is cooled to form a hardened thermoplastic polymer layer. In some embodiments, the polymer or polymer precursor is or includes the polymer precursor and solidifying the polymer or polymer precursor includes polymerizing the polymer precursor. In some embodiments, the polymer or polymer precursor is a resin and solidifying the polymer or polymer precursor includes curing the resin. Curing the resin can include applying actinic radiation to the resin, heating the resin, and/or catalyst curing. For example, the resin may be cured by applying radiation (e.g., ultraviolet (UV) radiation, or electron-beam radiation, or other actinic radiation), or by applying heat, or by using other cross-linking mechanisms known in the art. The resin may be an acrylate or an epoxy, for example, or other resin chemistries may be used.

In some embodiments, the materials chosen for the dielectric layers 131, 132 and the polymeric layer 110 have similar refractive indices. For example, as described further elsewhere herein, some of the through openings formed in the polymeric layer 110 do not contain metallic bodies. In such embodiments, it may be desired to substantially index match dielectric material in the through openings with the polymeric material of the layer 110, as described further elsewhere herein.

Figure 4A:
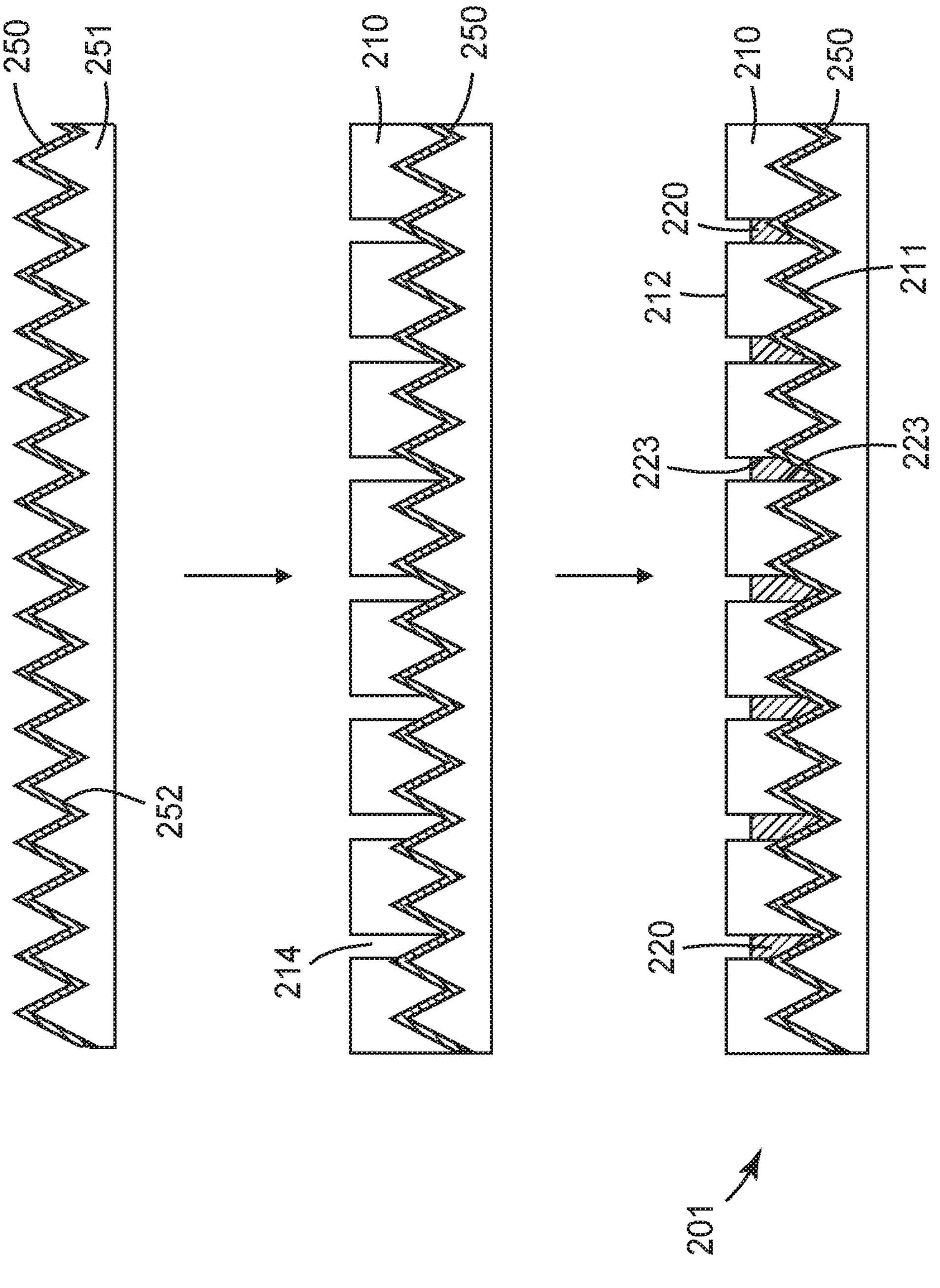
FIG. 4A is a schematic illustration of steps in an illustrative process for making a patterned article including a polymeric layer having a structured surface.
Figure 4B:
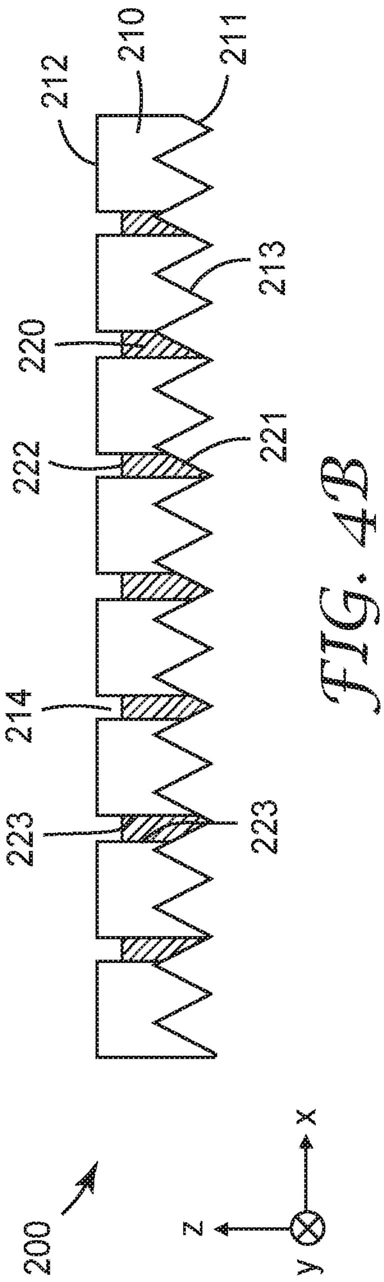
FIGS. 4B-4C are schematic cross-sectional views of illustrative articles that can be made by the process of FIG. 4A.
Figure 4C:
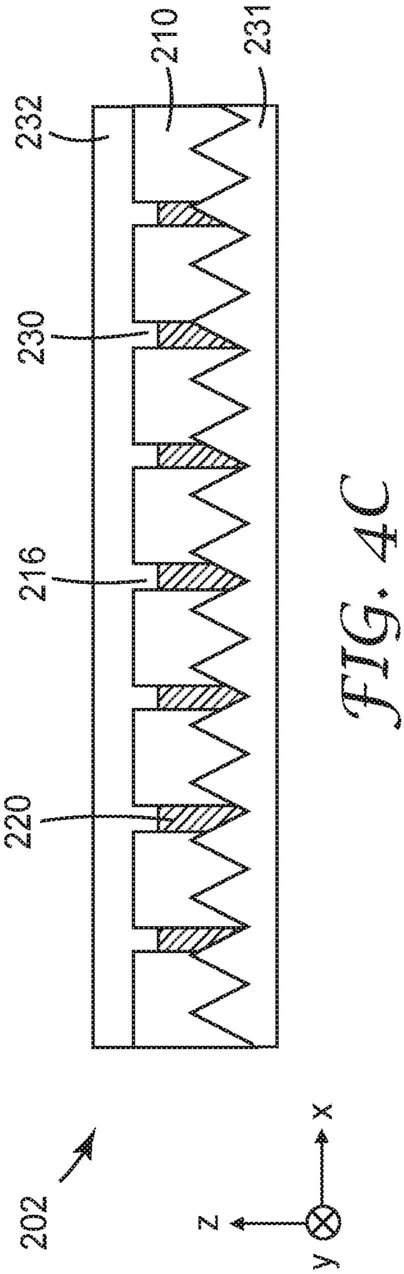

FIG. 4A is a schematic illustration of steps in a process for making a patterned article 201, 200, or 202, according to some embodiments. FIGS. 4B-4C are schematic cross-sectional views of illustrative patterned articles 200 and 202, respectively, that can be made by the process of FIG. 4A. Elements 210, 211, 212, 214, 216, 220, 222, 223, 230, 231, 232, 250, and 251 correspond to, and may be as described elsewhere for, elements 110, 111, 112, 114, 116, 120, 122, 123, 130, 131, 132, 150, and 151, respectively, except where indicated differently. The process includes, in sequence: providing a conductive layer 250; forming a polymeric layer 210 on the conductive layer 250, where the polymeric layer 210 defines a plurality of through openings 214 therein; depositing a metallic body 220 in each through opening in at least a first sub-plurality of the through openings such that the metallic body 220 contacts the conductive layer 250: and optionally removing the conductive layer 250 resulting in the metallic bodies 220 being electrically isolated from one another. In the illustrated embodiment, the conductive layer 250 is disposed on a structured major surface 252 of a substrate 251. This results in the first major surface 211 of the polymeric layer 210 being structured. The major surface of a layer including through openings is structured when the major surface itself, which does not include the openings, is structured. For example, major surface 111 is unstructured in the embodiment illustrated in FIG. 1A, for example, while major surface 211 is structured. A structured surface may include a plurality of non-coplanar portions or segments, for example. A structured surface may include a plurality of engineered structures (structures having a predetermined non-random geometry), for example. The process of FIG. 4A can optionally include an etching step after the polymeric layer 210 is initially formed as described for FIGS. 1A and 3B, for example. In the embodiments of FIGS. 4B-4C, the conductive layer 250 and the substrate 251 have been removed (e.g., by peeling or etching). In the embodiment of FIG. 4C, dielectric layers 231 and 232 have been added.

In some embodiments, a patterned article 200, 202 includes a polymeric layer 210 comprising a structured first major surface 211 and an opposing second major surface 212 and defining a plurality of through openings 214 therein. For each through opening in at least a first sub-plurality of the through openings, a metallic body 220 is disposed in the through opening. The metallic body 220 has a first outermost surface 221 adjacent the first major surface 211 of the polymeric layer 210, an opposite second outermost surface 222, and at least one lateral sidewall 223 extending therebetween, where each lateral sidewall 223 extends from the first outermost surface 221 of the metallic body 220 toward or to, but not past, the second major surface 212 of the polymeric layer 210. As described further elsewhere (see, e.g., FIG. 9), the metallic body 220 can be coextensive or substantially coextensive with the through opening 220 in at least one cross-section parallel to the polymeric layer 210. In some embodiments, the metallic bodies 220 are electrically isolated from one another.

The sidewall(s) 223 may extend to the second major surface 212 (see, e.g., FIGS. 1C, 2B) and/or a portion of the metallic bodies may extend beyond the second major surface 212 (see, e.g., FIG. 1D). In some embodiments, for each metallic body at least a majority of the metallic bodies 220, the second outermost surface 222 of the metallic body 220 is substantially flush with the second major surface 212 of the polymeric layer 210. In some embodiments, for each metallic body in at least a majority of the metallic bodies 220, the second outermost surface 222 of the metallic body 220 is disposed between the first and second major surfaces 211 and 212 of the polymeric layer 210.

In some embodiments, the conductive layer 250 is disposed on, and substantially conforms to, a structured major surface 252 of a substrate 251 (e.g., the conductive layer 250 can nominally conform to the structured major surface 252 or can conform up to variations less than about 20 percent or less than about 10 percent or less than about 5 percent of a height of structures of the structured major surface 252). The structured major surface 252 may be formed by microreplication (e.g., a cast and cure process using a structured tool), for example, and may include a regular array of structures. The substrate 251 can include one or more layers. For example, the substrate 251 can include a layer formed by a microreplication process disposed on a carrier layer. In some embodiments, the substrate 251 includes at least one dielectric layer and optionally at least one conductive layer (e.g., an internal conductive layer in addition to the conductive layer 250 disposed on the substrate 251). In some embodiments, the structured first major surface 211 includes a regular array of structures 213.

In some embodiments, the metallic bodies are disposed in a first sub-plurality of the through openings but not in a second sub-plurality of the through openings. Patterned masking layers and/or patterned conductive layers can be used to select the first sub-plurality of the through openings which includes the metallic bodies. In some embodiments, it is desired to form a regular pattern of through openings (e.g., using a structured tool with a regular pattern of structures) and to form metallic bodies in some, but not others, of the through openings so that the metallic bodies are disposed in a different pattern than the through openings.

Figure 5A:
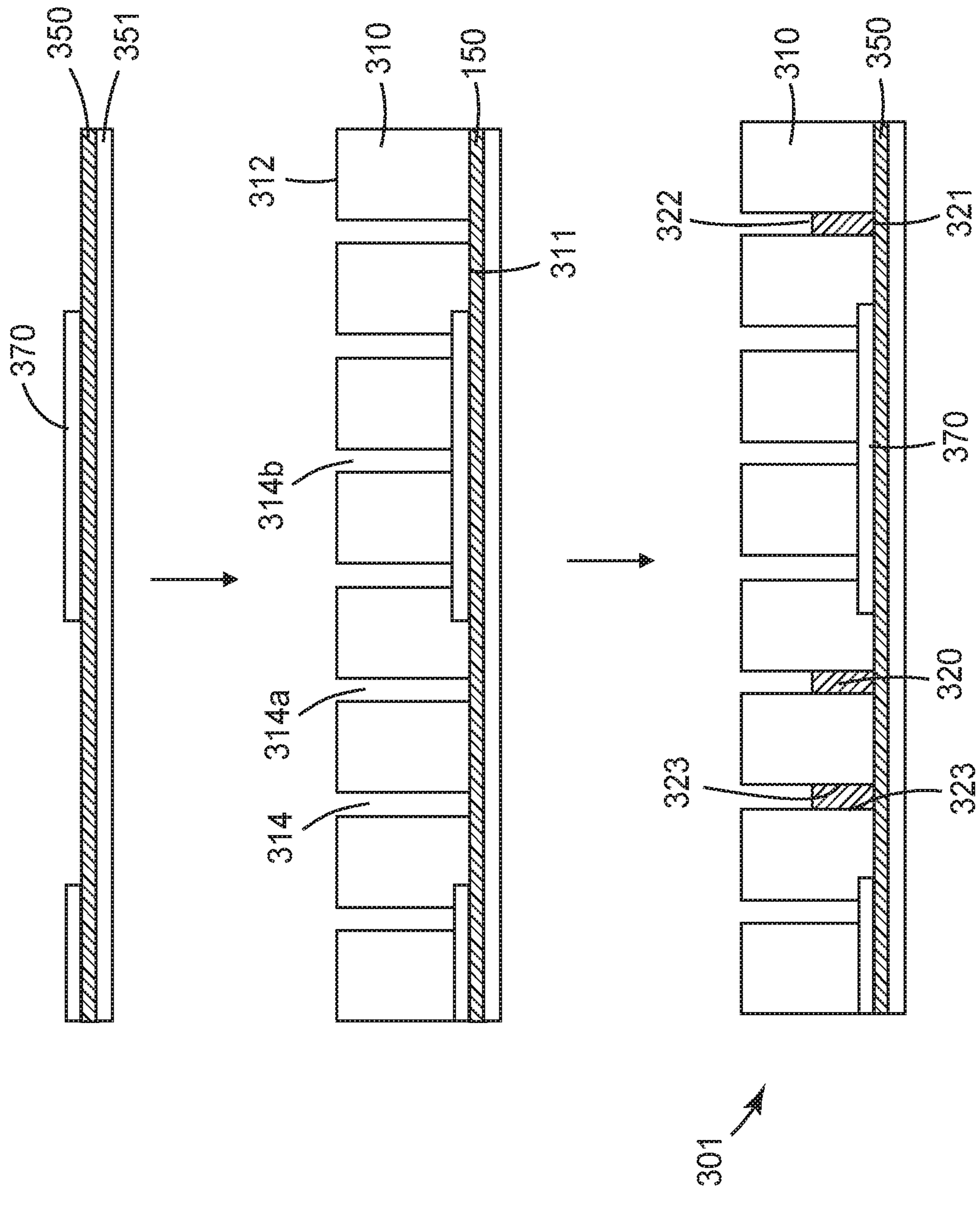
FIG. 5A is a schematic illustration of steps in an illustrative process for making a patterned article where the process can include disposing a patterned mask layer on a conductive layer.
Figure 5B:
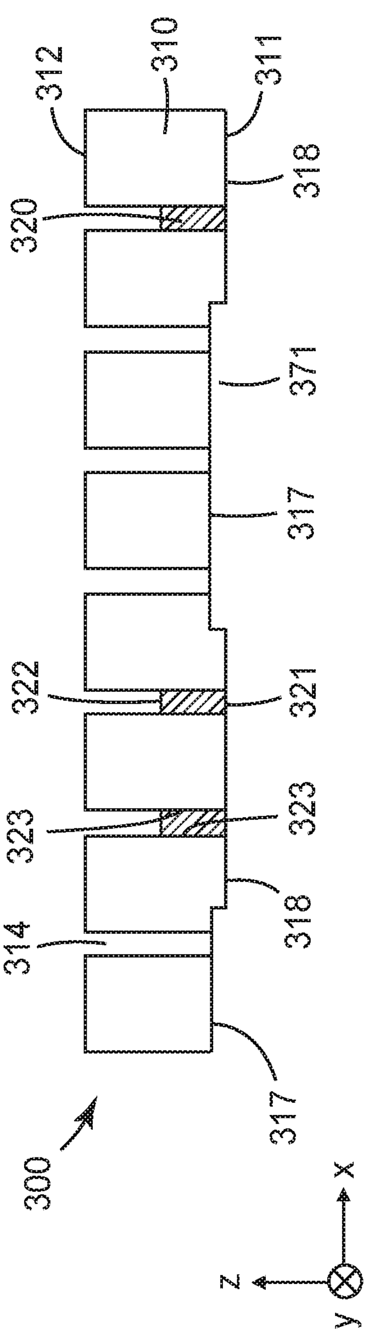
FIGS. 5B-5E are schematic cross-sectional views of illustrative articles that can be made by the process of FIG. 5A.
Figure 5C:
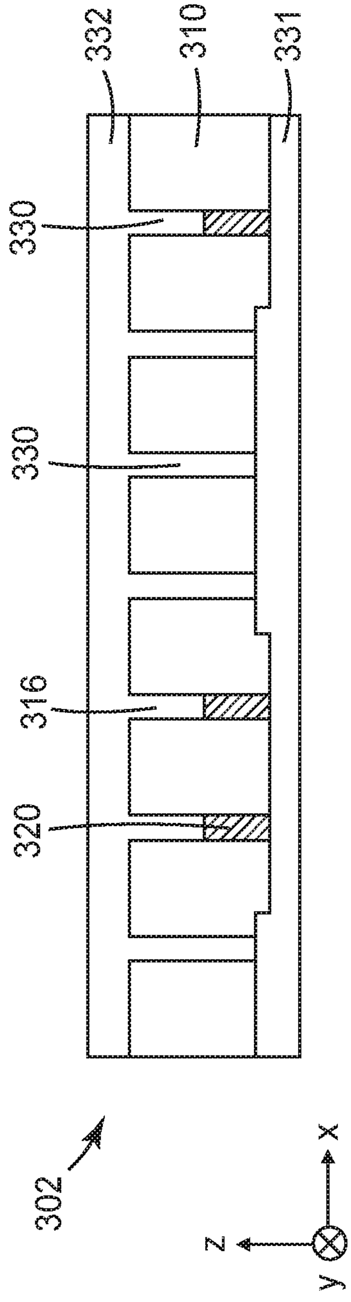
Figure 5D:
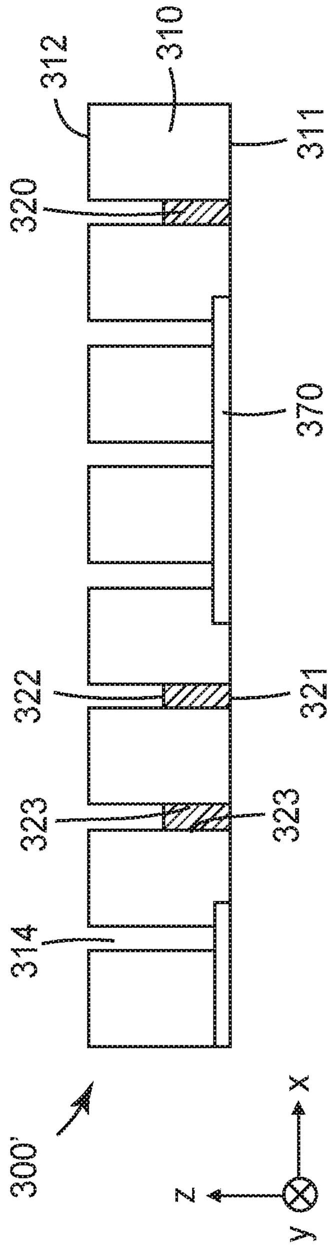
Figure 5E:
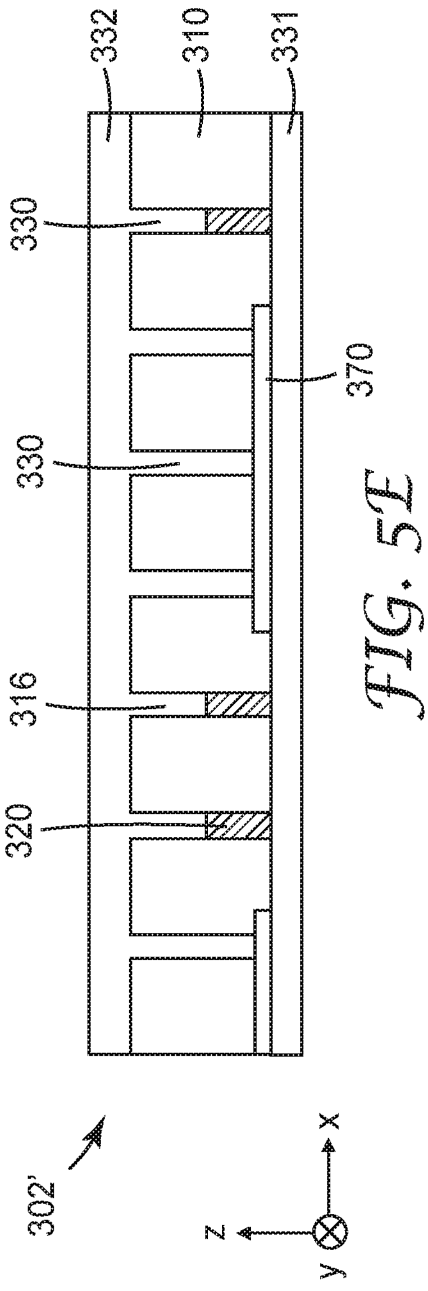

FIG. 5A is a schematic illustration of steps in a process for making a patterned article 301, 300, 300', 302, or 302', according to some embodiments. FIGS. 5B-5C are schematic cross-sectional views of illustrative patterned articles 300 and 302, respectively, that can be made by the process of FIG. 5A. FIGS. 5D-5E are schematic cross-sectional views of illustrative articles 300' and 302'', respectively, that can be made by the process of FIG. 5A. Elements 310, 311, 312, 314, 316, 320, 321, 322, 323, 330, 331, 332, 350, and 351 correspond to, and may be as described elsewhere for, elements 110, 111, 112, 114, 116, 120, 121, 122, 123, 130, 131, 132, 150, and 151, respectively, except where indicated differently. The first major surface 311 of the polymeric layer 310 is structured. In some embodiments, the first major surface 311 of the polymeric layer 310 includes substantially planar first and second portions 317 and 318, where the first and second portions 317 and 318 are parallel to, but not coplanar with, one another.

In some embodiments, a process for making a patterned article includes, between a providing a conductive layer 350 step and a forming a polymeric layer 310 step, disposing a patterned mask layer 370 on the conductive layer 350, where the forming step includes forming the polymeric layer 310 over the patterned mask layer 370. The process can include depositing a metallic body 320 in each through opening in at least a first sub-plurality 314*a* of the through openings 314. In some embodiments, a second sub-plurality 314*b* of the through openings 314 is blocked by the patterned mask layer 370, so the metallic bodies 320 are not deposited into the second sub-plurality 314*b* of the through openings. The polymeric layer 310 can be formed using a microreplication process, for example. The process of FIG. 5A can optionally include an etching step after the polymeric layer 310 is initially formed as described for FIGS. 1A and 3B, for example. The etching step may remove a portion of the patterned mask layer 370. In embodiments where the patterned mask layer 370 is included and an etching step is carried out, it is typically preferred that the mask layer is insensitive to the etching and/or has sufficient thickness that at least a portion of the layer remains after the etching.

The patterned mask layer 370 can be formed by printing (e.g., digital printing, flexographic printing, or other printing processes) or otherwise depositing a material onto the conductive layer 350. Any suitable material can be used for the patterned mask layer 370 or the patterned mask layer 470 described elsewhere. The material for the mask layer can be a polymeric material, such as the materials described for the polymeric layer 110. In some embodiments, an epoxy-based material is used (e.g., SU-8 photoresist).

In some embodiments, the conductive layer 350 and optional substrate layer 351 are removed after the metallic bodies 320 are formed. In some such embodiments, the patterned mask layer 370 is also removed, as illustrated in FIG. 5B, leaving a space 371 which may subsequently be filled with a dielectric material, or the patterned mask layer 370 may be retained as illustrated in FIG. 5D. In either case, dielectric layer(s) 331 and/or 332 may be included as illustrated in FIGS. 5C and 5E.

In some embodiments, the sidewall(s) 323 may extend to the second major surface 312 (see, e.g., FIGS. 1C, 2B) and/or a portion of the metallic bodies 320 may extend beyond the second major surface 312 (see, e.g., FIG. 1D).

Figure 6A:
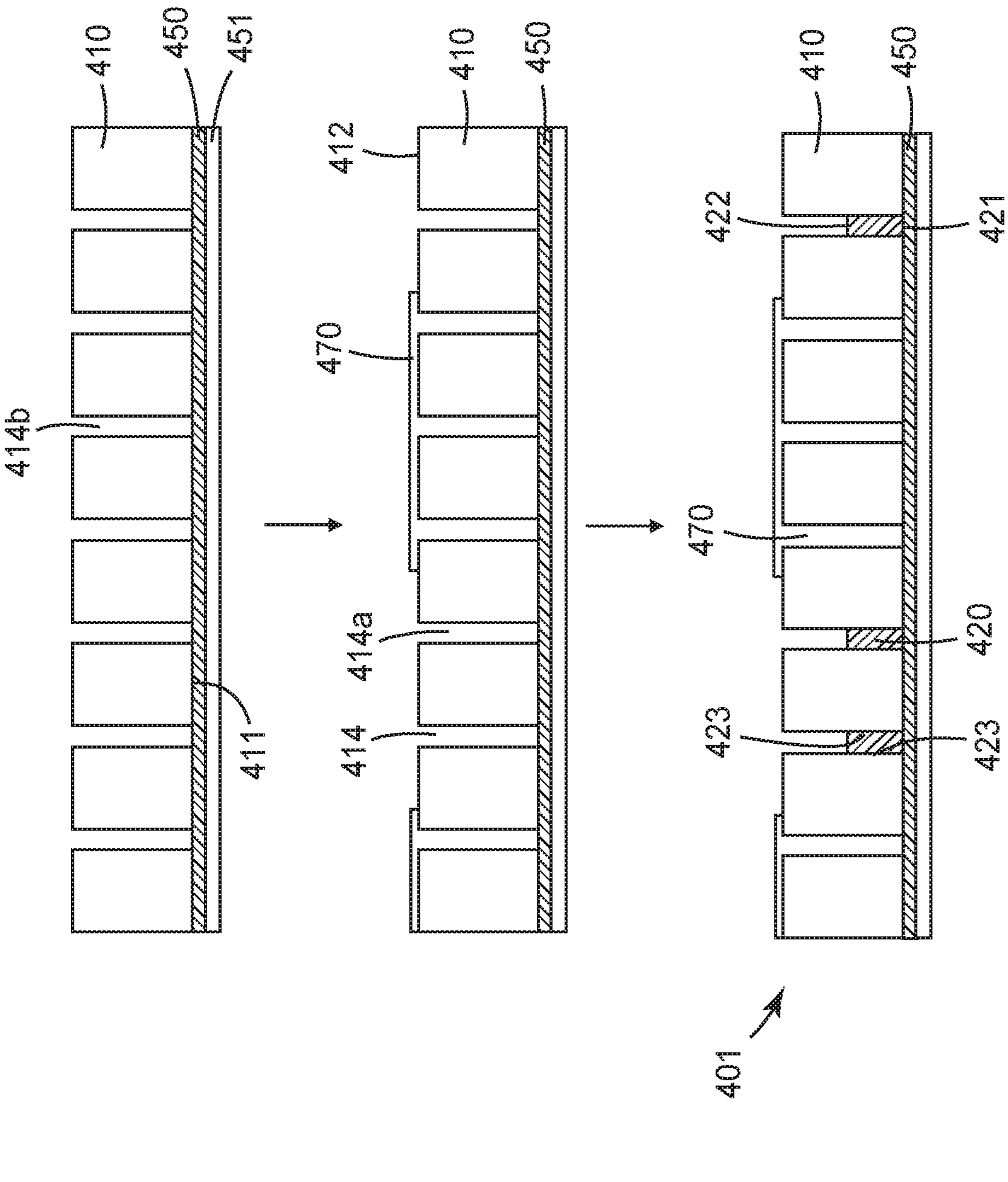
FIG. 6A is a schematic illustration of steps in an illustrative process for making a patterned article where the process can include disposing a patterned mask layer on a polymeric layer.
Figure 6B:
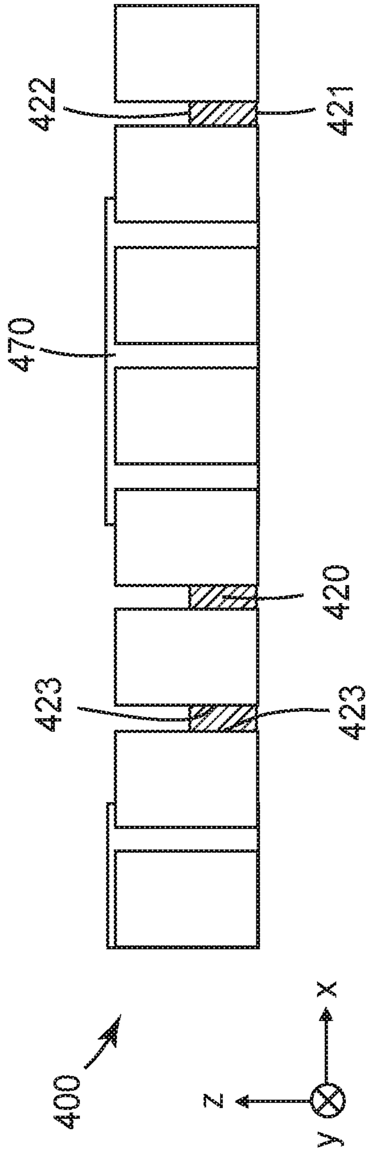
FIGS. 6B-6C are schematic cross-sectional views of illustrative articles that can be made by the process of FIG. 6A.
Figure 6C:
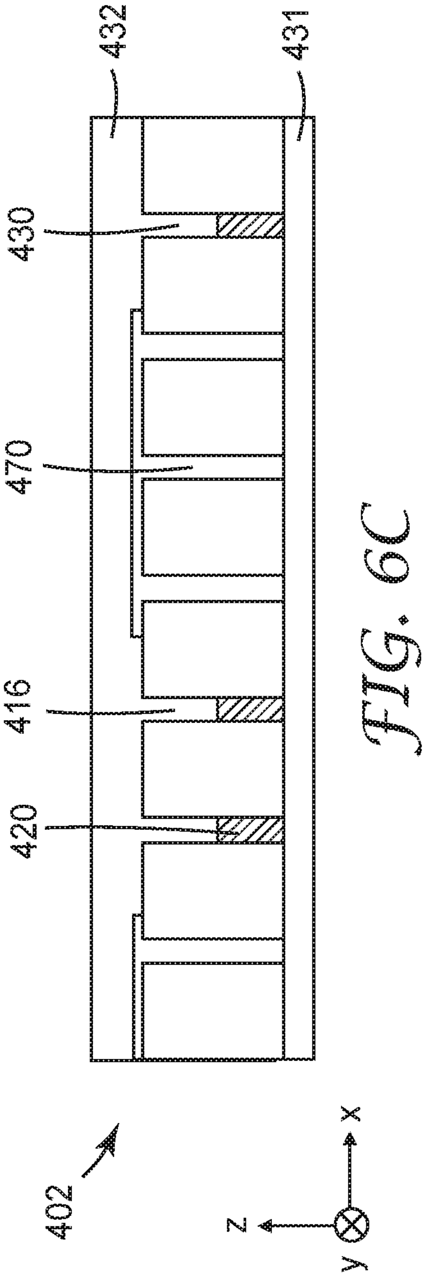

FIG. 6A is a schematic illustration of steps in a process for making a patterned article 401, 400, or 402, according to some embodiments. FIGS. 6B-6C are schematic cross-sectional views of illustrative patterned articles 400 and 402, respectively, that can be made by the process of FIG. 6A. Elements 410, 411, 412, 414, 416, 420, 421, 422, 423, 430, 431, 432, 450, and 451 correspond to, and may be as described elsewhere for, elements 110, 111, 112, 114, 116, 120, 121, 122, 123, 130, 131, 132, 150, and 151, respectively, except where indicated differently. In the embodiments of FIGS. 6B-6C, the conductive layer 450 and the substrate 451 have been removed (e.g., by peeling or etching). In the embodiment of FIG. 6C, dielectric layers 431 and 432 have been added.

In some embodiments, a process for making a patterned article includes, between a forming a polymeric layer 410 step and a depositing a metallic body step, disposing a patterned mask layer 470 over the polymeric layer 410 such that some of the through openings 414*b* are at least partially filled with the patterned mask layer 470. The process can include depositing a metallic body 420 in each through opening in at least a first sub-plurality 414*a* of the through openings 414. In some embodiments, a second sub-plurality 414*b* of the through openings 414 is blocked by the patterned mask layer 470, so the metallic bodies 420 are not deposited into the second sub-plurality 414*b* of the through openings. The polymeric layer 410 can be formed using a microreplication process, for example. The process of FIG. 6A can optionally include an etching step after the polymeric layer 410 is initially formed as described for FIGS. 1A and 3B, for example. In embodiments where the patterned mask layer 470 is included and an etching step is carried out, it is typically preferred that the layer is insensitive to the etching and/or has sufficient thickness that that at least a portion of the layer remains after the etching.

In some embodiments, the sidewall(s) 423 may extend to the second major surface 412 (see, e.g., FIGS. 1C, 2B) and/or a portion of the metallic bodies 420 may extend beyond the second major surface 412 (see, e.g., FIG. 1D).

Figure 7A:
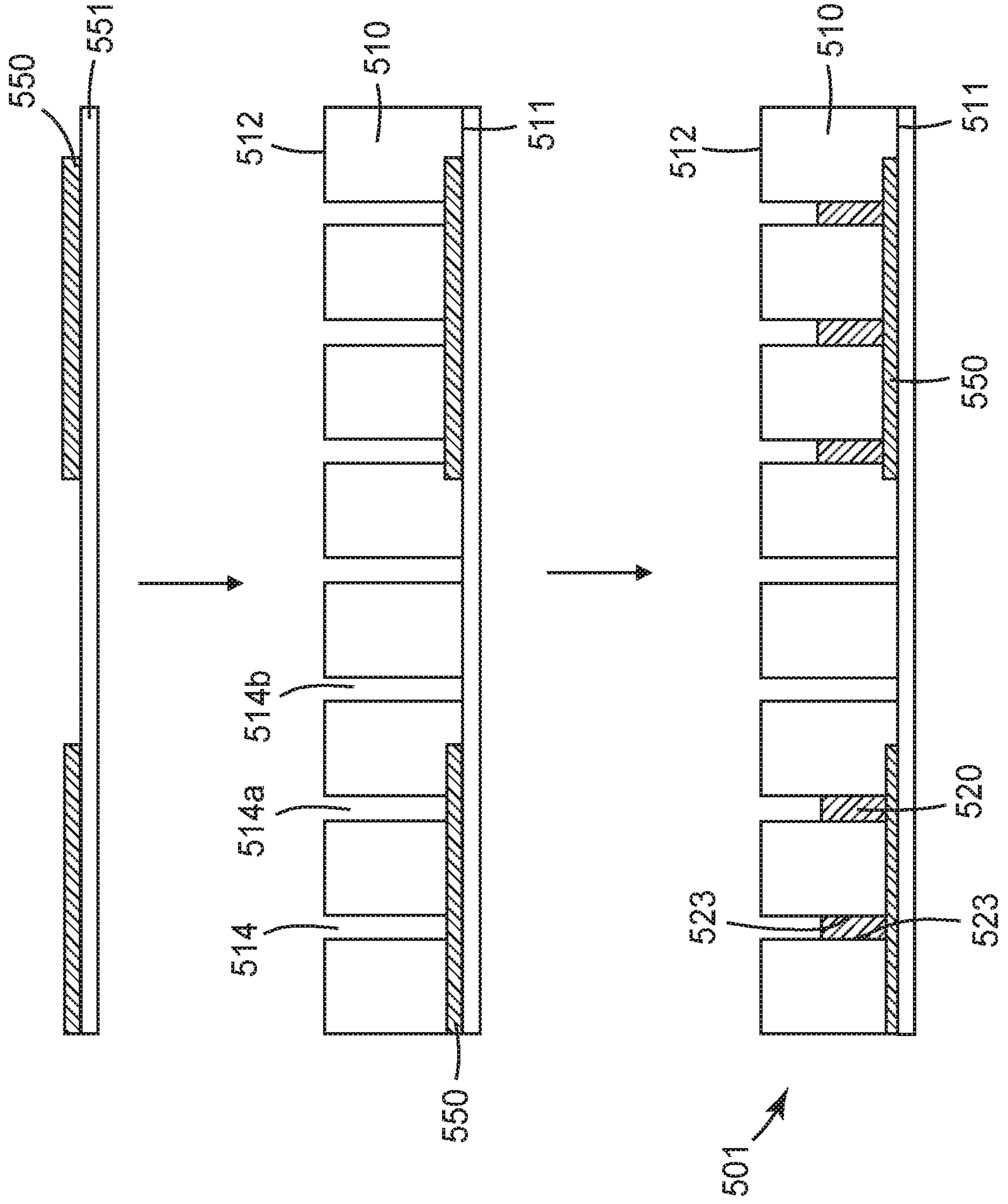
FIG. 7A is a schematic illustration of steps in an illustrative process for making a patterned article where the process can include utilizing a patterned conductive layer.
Figure 7B:
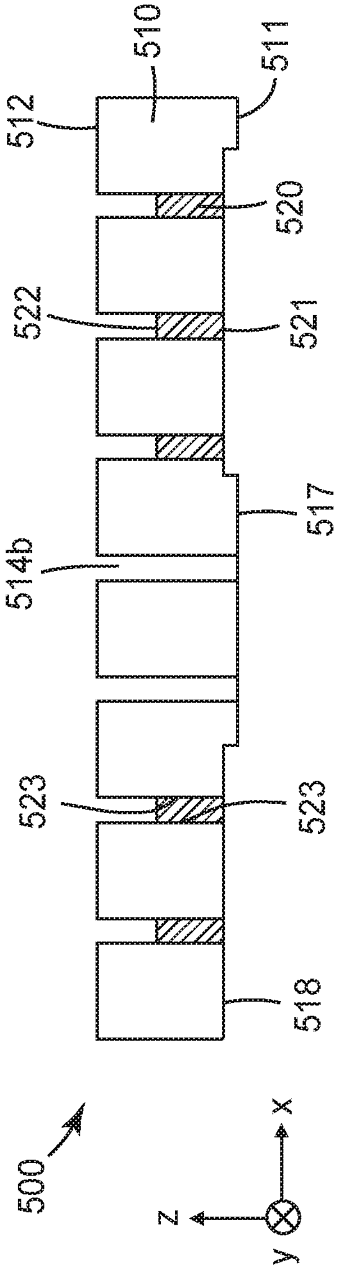
FIGS. 7B-7C are schematic cross-sectional views of illustrative articles that can be made by the process of FIG. 7A.
Figure 7C:
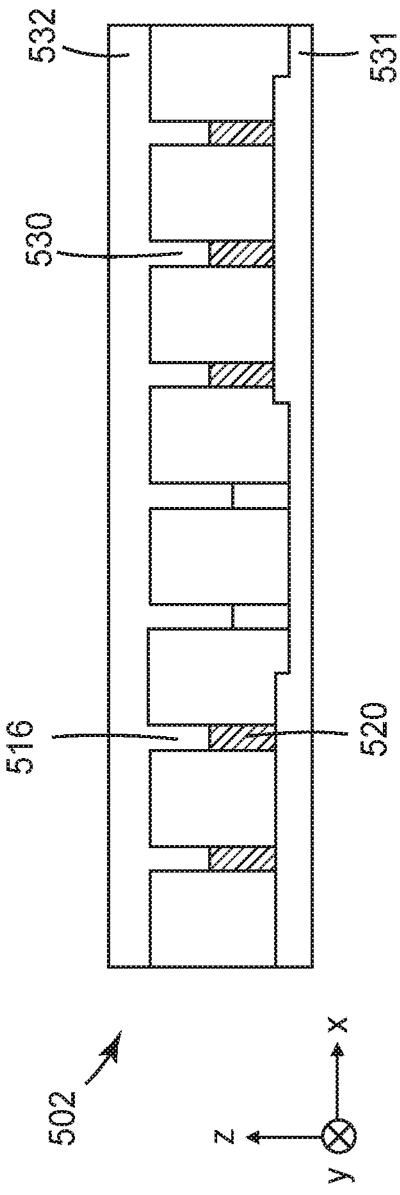

FIG. 7A is a schematic illustration of steps in a process for making a patterned article 501, 500, or 502, according to some embodiments. FIGS. 7B-7C are schematic cross-sectional views of illustrative patterned articles 500 and 502, respectively, that can be made by the process of FIG. 7A. Elements 510, 511, 512, 514, 516, 520, 521, 522, 523, 530, 531, 532, 550, and 551 correspond to, and may be as described elsewhere for, elements 110, 111, 112, 114, 116, 120, 121, 122, 123, 130, 131, 132, 150, and 151, respectively, except where indicated differently. The conductive layer 550 is patterned (e.g., by etching). The first major surface 511 of the polymeric layer 510 is structured. In some embodiments, the first major surface 511 of the polymeric layer 510 includes substantially planar first and second portions 517 and 518, where the first and second portions 517 and 518 are parallel to, but not coplanar with, one another. In the embodiments of FIGS. 7B-7C, the conductive layer 550 and the substrate 551 have been removed (e.g., by peeling or etching). In the embodiment of FIG. 7C, dielectric layers 531 and 532 have been added.

The process for making a patterned article can include depositing a metallic body 520 in each through opening in at least a first sub-plurality 514*a* of the through openings 514. For example, the first sub-plurality 514*a* of the through openings 514 can be covered by the conductive layer 550, which may form a continuous conducive path (e.g., outside of the illustrated cross-section), and which may be used in electroplating the metallic bodies on the conductive layer 550. In some embodiments, for each through opening in a second sub-plurality 514*b* of the through openings, no metallic body is disposed in the through opening. For example, there may be no conductive layer over the second sub-plurality 514*b* of the through openings 514 onto which a metallic body is electroplated. In some embodiments, the through openings 514*b* are filled or substantially filled with dielectric layer(s) 531 and/or 532 as schematically illustrated in FIG. 7C, for example. The polymeric layer 510 can be formed using a microreplication process, for example. The process of FIG. 7A can optionally include an etching step after the polymeric layer 710 is initially formed as described for FIGS. 1A and 3B, for example.

In some embodiments, the sidewall(s) 523 may extend to the second major surface 512 (see, e.g., FIGS. 1C, 2B) and/or a portion of the metallic bodies 520 may extend beyond the second major surface 512 (see, e.g., FIG. 1D).

Figure 8:
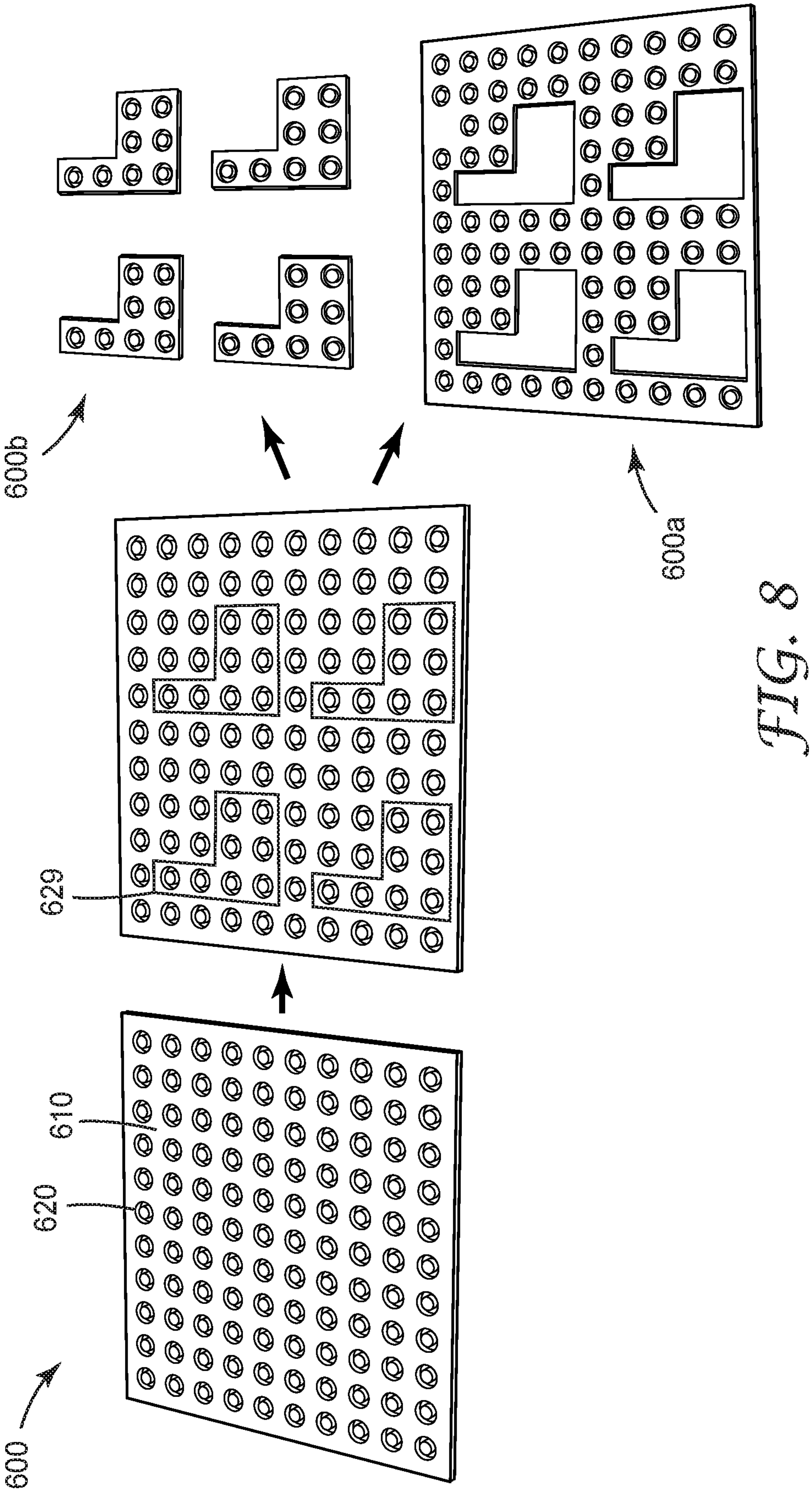
FIG. 8 schematically depicts an illustrative process of forming illustrative patterned articles that include patterned arrangements of metallic bodies.

FIGS. 5A-7C schematically illustrate various approaches to provide patterned arrangements of metallic bodies. FIG. 8 schematically illustrates another process of forming a patterned article including patterned arrangements of metallic bodies, according to some embodiments. A patterned article 600 includes a polymeric layer 610 defining a plurality of through openings therein where for each through opening in at least a first sub-plurality of the through openings (all of the through openings in the illustrated embodiment), a metallic body 620 is disposed in the through opening. The patterned article 600 can be cut to create a desired pattern. Portions 629 can then be removed to form a patterned article 600*a* and/or the portions 629 can be laminated to a separate layer or film to hold the portions 629 in a desired pattern to form patterned article 600*b*.

Figure 9:
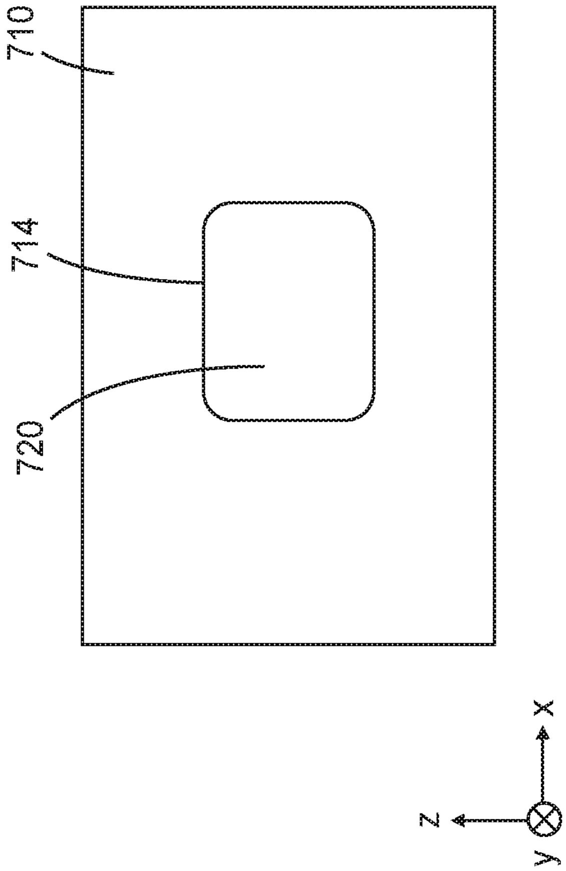
FIG. 9 is a schematic cross-sectional view of a portion of a patterned article showing an illustrative metallic body.

For any of the patterned articles described herein, a metallic body can be coextensive or substantially coextensive with the corresponding through opening in at least one cross-section parallel to the polymeric layer. FIG. 9 is a schematic cross-sectional view of a portion of a patterned article showing a metallic body 720 coextensive with a through opening 714, according to some embodiments. The cross-section is parallel to the polymeric layer 710 (e.g., parallel to the x-y plane). A metallic body can be considered substantially coextensive with a through opening in a cross-section, when the metallic body is coextensive with at least 80% of an area of the through opening in the cross-section. In some embodiments, the metallic body is coextensive with at least 90%, or at least 95%, or at least 98%, or 100% of an area of the through opening in the cross-section.

In some embodiments, a patterned article is at least one of an antenna, an antenna array, a retrodirective antenna array, a Van Atta array, a retroreflector, reflective traffic sheeting, conspicuity sheeting, a heater, an electromagnetic interference (EMI) shield, an electrostatic dissipation component, a sensor, a filter for electromagnetic waves, an architectural film, or an electrode. In some embodiments, the patterned article is or includes an array of any of these elements or devices. In some embodiments, a patterned article is at least one of an antenna, a sensor, or a retroreflector. In some embodiments, the patterned article is a sensor such as a touch sensor. In some embodiments, the patterned article is substantially transparent and/or is a flexible film. In some embodiments, the antenna, array of antennas, antenna array, retrodirective antenna array, Van Atta array, heater, electromagnetic interference shield, electrostatic dissipation component, sensor, filter for electromagnetic waves, or electrode, is substantially transparent and/or is a flexible film.

Figure 10A:
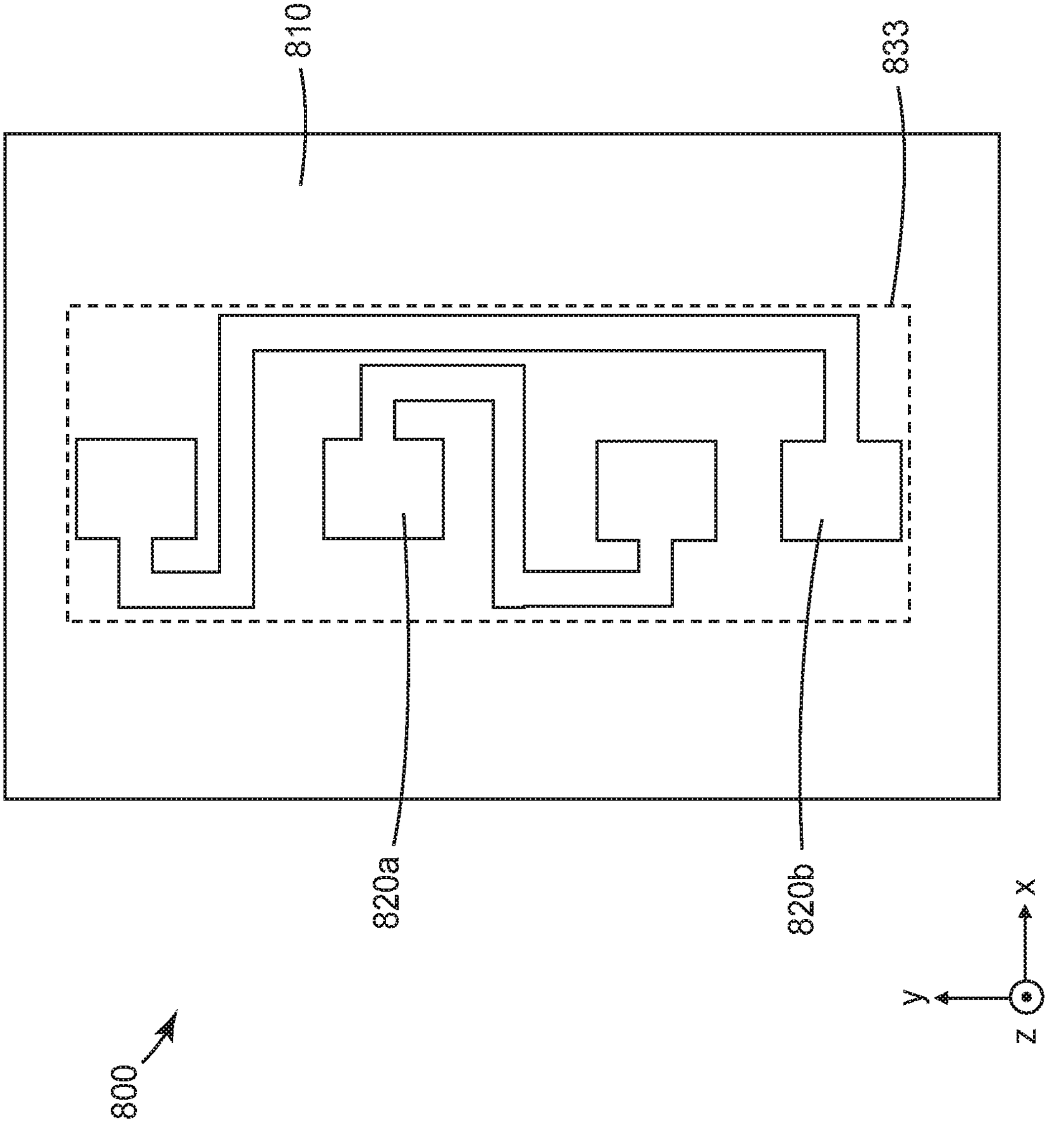
FIGS. 10A-10C are schematic top plan views of illustrative patterned articles.
Figure 10B:
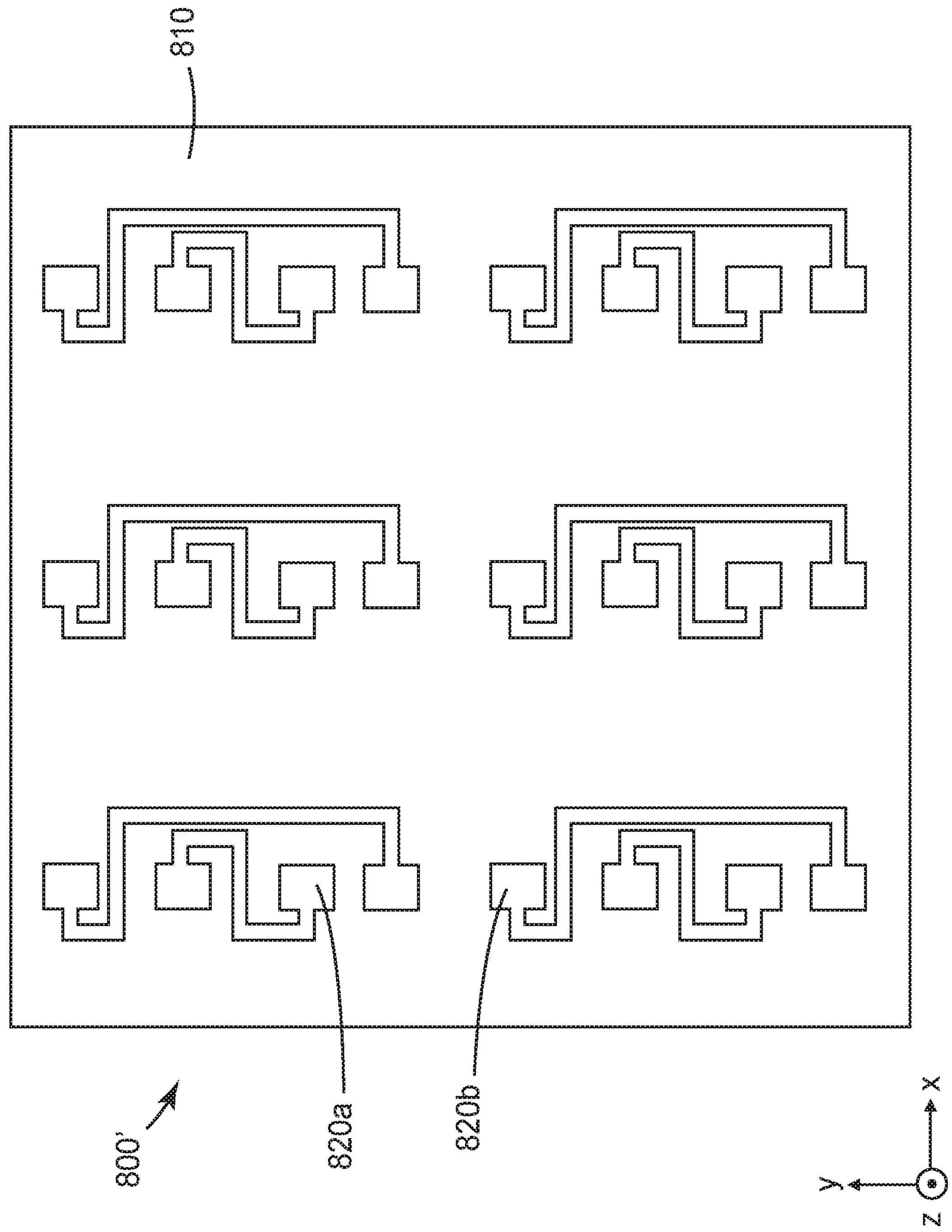
Figure 10C:
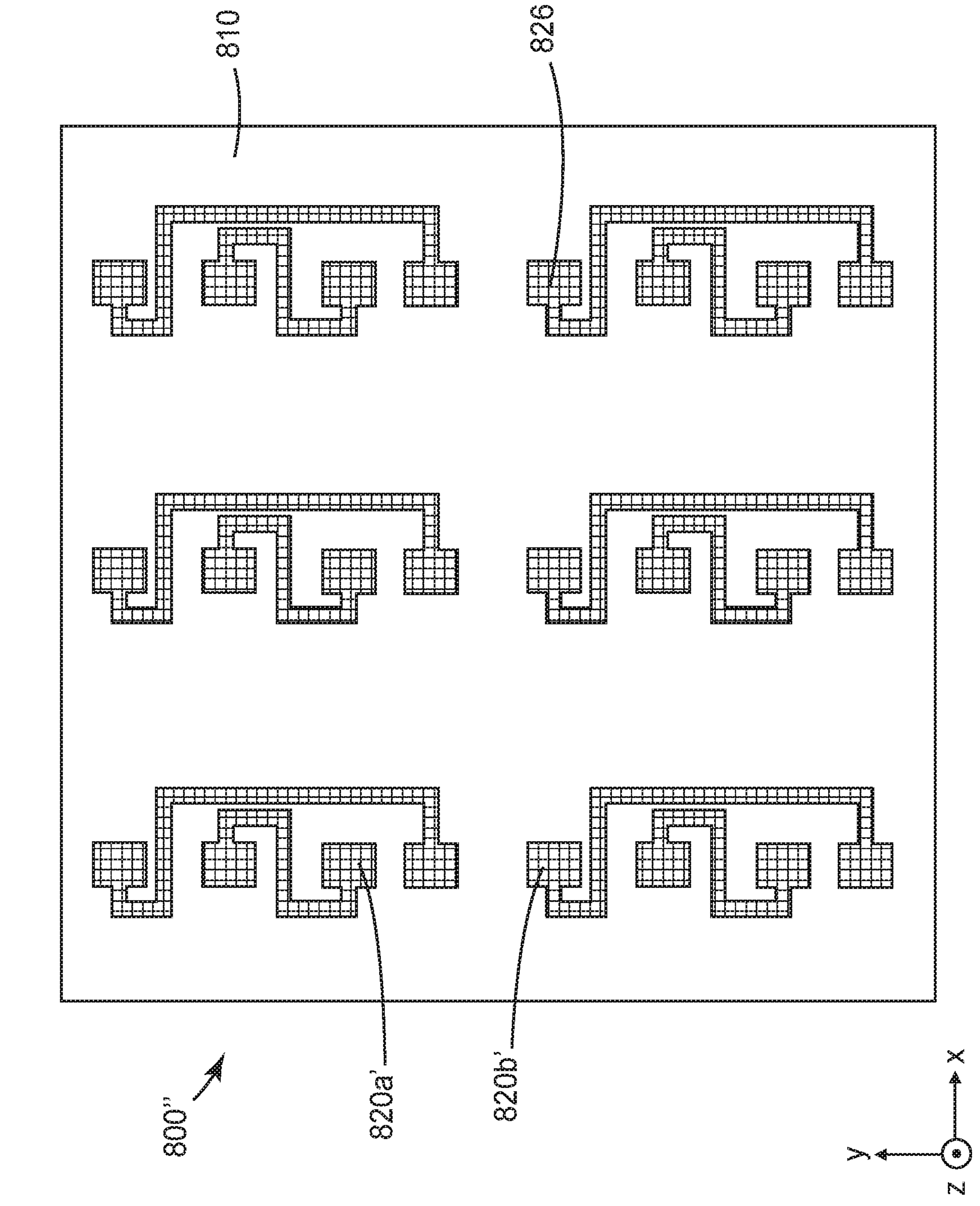

FIGS. 10A-10C are schematic top plan views of patterned articles 800, 800', and 800", respectively. Patterned article 800 includes first and second metallic bodies **820*a* and 820*b* disposed in respective through openings in a polymeric layer 810 and which may be electrically isolated from each other. Patterned article 800' includes an array of pairs of the first and second metallic bodies 820*a* and 820*b*. More generally, patterned article 800 can include a plurality (e.g., 2, 3 or more) metallic bodies which may be electrically isolated from one another, and patterned article 800' can include an array where each element of the array corresponds to patterned article 800**.

In some embodiments, the geometry of the first and second metallic bodies **820*a* and 820*b* can be characterized as follows. In some embodiments, in a top plan view, the first metallic body 820*a* is disposed at least partially inside a smallest rectangle 833** containing the second metallic body.

The metallic bodies **820*a*, 820*b* in patterned articles 800 or 800' can be solid metallic bodies or can be or include a micropattern of metallic traces. For example, patterned article 800" corresponds to patterned article 800' except that the metallic bodies 820*a*, 820*b* have been replaced with metallic bodies 820*a*', 820*b*' which include a micropattern of metallic traces 826**. In some embodiments, it is desired to use a micropattern of metallic traces so that the patterned article, or a layer of the patterned article including the metallic bodies, is substantially transparent. For example, in some embodiments, the patterned article, or the layer of the patterned article including the metallic bodies, has an average optical transmittance for normally incident visible light (wavelengths in a range of 400 nm to 700 nm) of at least 50%, or at least 70%, or at least 80%, or at least 90%.

In some embodiments, the metallic bodies (e.g., **820*a*, 820*b* or the array of elements 820*a*, 820*b***) define an antenna. In some embodiments, the antenna is or includes a retrodirective antenna array.

The patterned article may be a 5G antenna, for example, and/or may be configured to transmit and receive in a frequency band from 0.7, 1, 5 10, 20 or 30 GHz to 300, 200, or 100 GHz, for example (e.g., 0.7 to 100 GHz). Useful antenna geometries are described in U.S. Pat. Appl. Publ. Nos. 2009/0051620 (Ishibashi et al.), 2009/0303125 (Caille et al.), and 2013/0264390 (Frey et al.), for example, and in International Appl. No. US2020/031450 titled "PATTERNED ARTICLE INCLUDING ELECTRICALLY CONDUCTIVE ELEMENTS" and filed on May 5, 2020, for example. In some embodiments, the patterned article is a substantially transparent antenna. For example, in some embodiments, the patterned article is adapted to be placed on a window where it is desired to use the article as an antenna and be able to see through the antenna. In some embodiments, the substantially transparent antenna is an antenna array such as a 5G antenna array or a retrodirective antenna array (e.g., a Van Atta array). In some embodiments, a patterned article includes an array of antennas that are subsequently singulated to provide antennas which may corresponding to patterned article 800, for example.

Figure 11A:
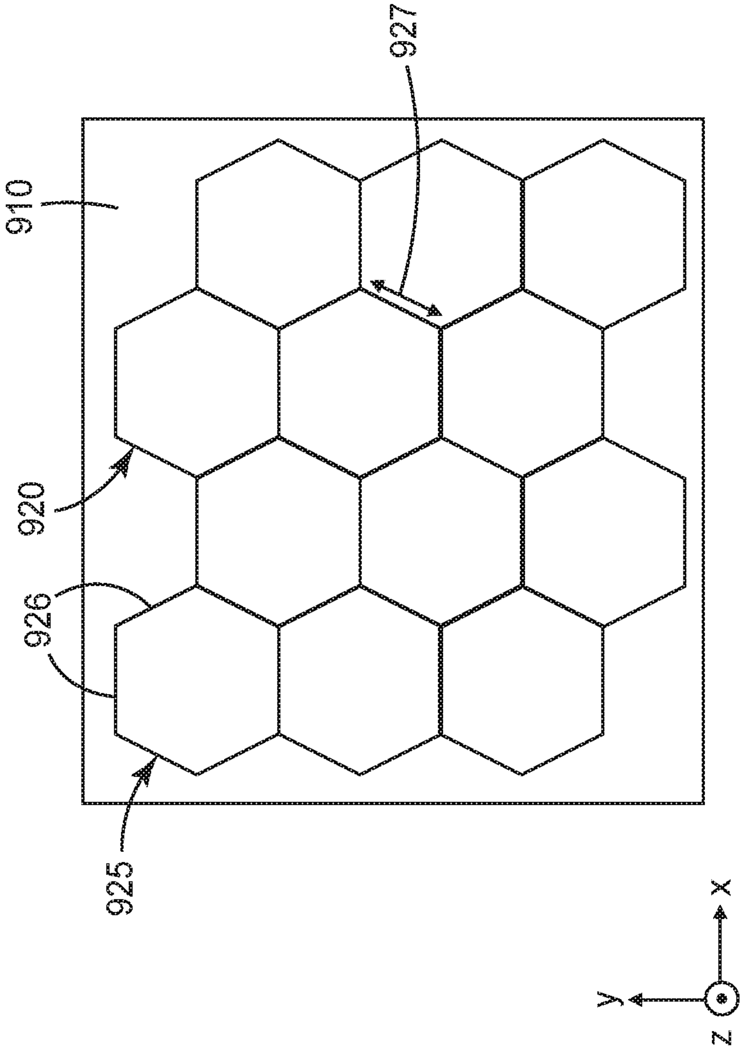
FIG. 11A is a schematic top plan view of a portion of an illustrative patterned article including a metallic body that includes metallic traces.
Figure 11B:
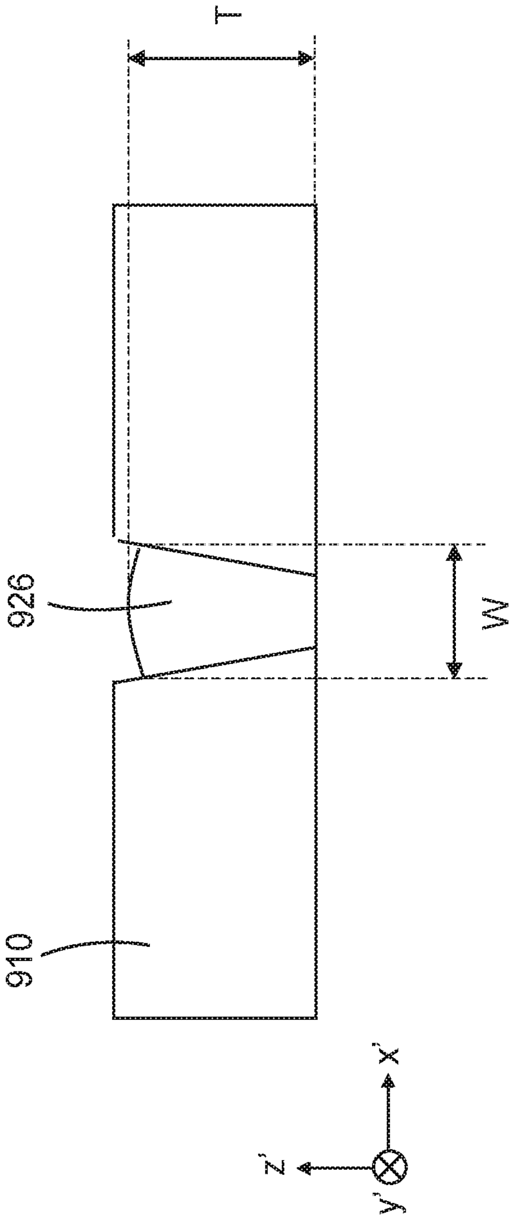
FIG. 11B is a schematic cross-sectional view of a portion of a patterned article schematically showing an illustrative metallic trace.

FIG. 11A is a schematic top plan view of a portion of the patterned article including a metallic body 920 disposed in a through opening in a polymeric layer 910, according to some embodiments. In some embodiments, at least some of the metallic bodies (e.g., the illustrated metallic body 920) include a micropattern 925 of metallic traces 926. FIG. 11B is a schematic cross-sectional view of a portion of the patterned article schematically illustrating an illustrative metallic trace 926. In some embodiments, each metallic trace 926 in at least a majority of the metallic traces in the micropattern 925 extends along a longitudinal direction 927 (or the y' direction referring to the x'-y'-z' coordinate system illustrated in FIG. 11B) of the metallic trace, has a width W along a width direction (x'-direction) orthogonal to the longitudinal direction 927 and to a thickness direction (z'-direction) of the polymeric layer 910, and has a thickness T along the thickness direction. In some embodiments, T/W is at least 0.8, 1, 1.2, 1.5, 2, 5, or 7.

In some embodiments, the micropattern 925 of metallic traces 926 has an open area fraction in a range of 80% to 99.95%, or 80% to 99.9%, or 85% to 99.9%, or 90% to 99.9%, or 95% to 99.9%. A high open area fraction can provide a high optical transmittance, for example, while still providing a desired electrical conductance when T/W is in a range described elsewhere, for example. In some embodiments, in a top plan view, a total area of the micropattern 925 of metallic traces 926 is less than 50%, or less than 20%, or less than 10%, or less than 5%, or less than 3%, or less than 2%, or less than 1% of a total surface area of the patterned article.

The micropattern of metallic traces may be or include a mesh pattern which may be a two-dimensional regular array (e.g., a rectangular, square, triangular, or hexagonal array) or a two-dimensional irregular array of the traces. Suitable micropattern geometries include those described in U.S. Pat. Appl. Publ. Nos. 2008/0095988 (Frey et al.), 2009/0219257 (Frey et al.), 2015/0138151 (Moran et al.), 2013/0264390 (Frey et al.), and 2015/0085460 (Frey), for example.

In some embodiments, each trace may be considered to be a metallic body where the metallic bodies (traces) are electrically connected to one another to form a micropattern, for example. Each trace may be disposed in a groove-shaped (e.g., having a width small compared to its length) through opening. The groove-shaped through openings may be interconnected to form a larger through opening.

Figure 12:
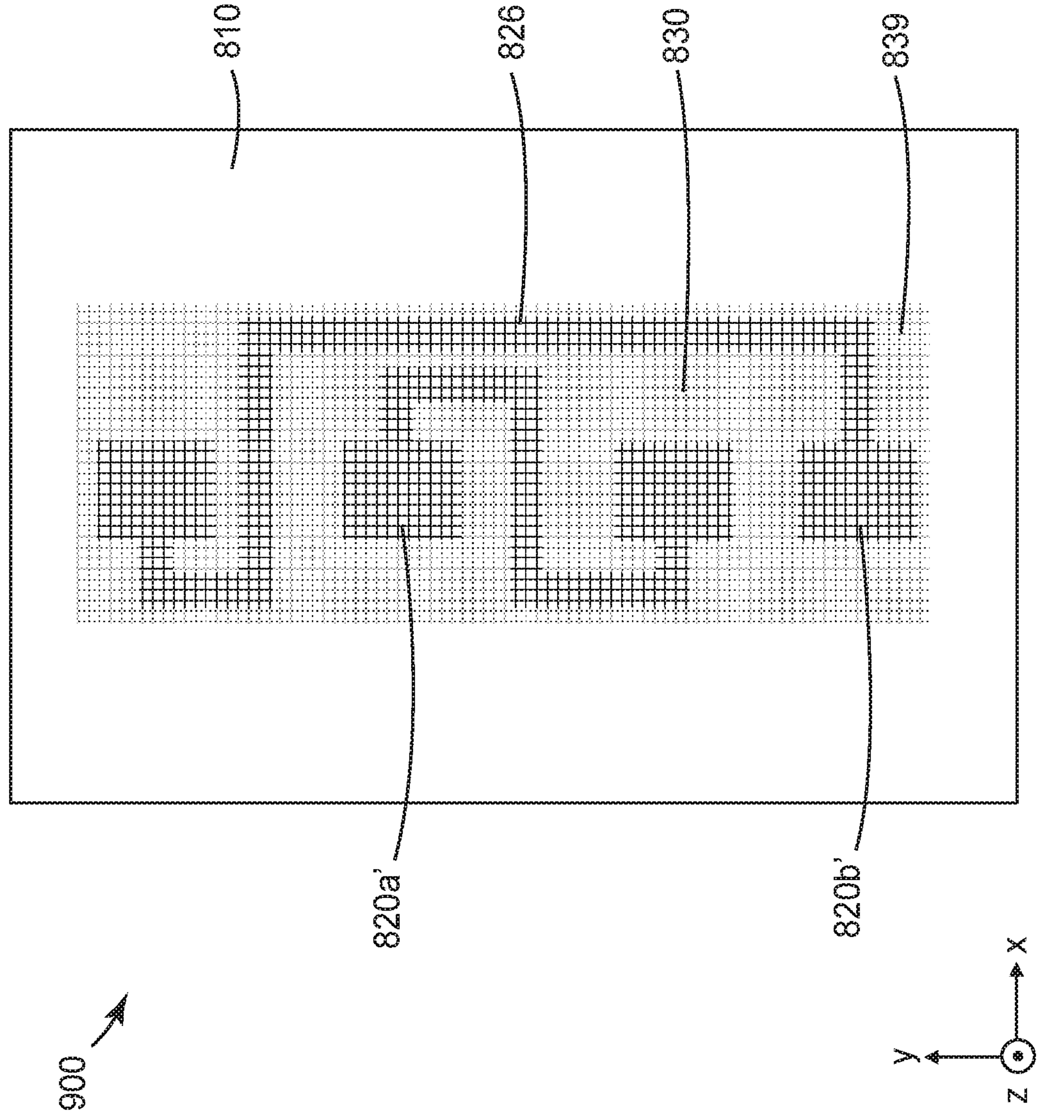
FIG. 12 is a schematic top plan view of an illustrative patterned article including metallic bodies disposed in some through openings.

FIG. 12 is a schematic top plan view of a patterned article 900 that includes the metallic bodies **820*a*', 820*b*' which include a micropattern of metallic traces 826 as described elsewhere. The patterned article further includes a micropattern of material 830 disposed in through openings. For example, material 830 may correspond to material 330 in through openings 314*b* depicted in FIGS. 5C and 5E, or to the material of the patterned mask layer 470 in through openings 414*b* depicted in FIG. 6C, or to the material of the dielectric layers 531 and 532 in through openings 514*b* depicted in FIG. 7C, for example. The material 830** is typically non-conductive.

It is sometimes desired to form a regular pattern of through openings (e.g., groove-shaped through openings) in a region 839 of the polymeric layer 810 and then to deposit metallic traces in only some of the through openings to form metallic bodies **820*a*' and 820*b*. It may be desired to dispose material 830 in the remaining through openings to minimize optical effects (e.g., light scattering) of the remaining through openings. In some embodiments, the material 830 is substantially index matched to the material of the polymeric layer 810. In some embodiments, the material 830 has a refractive index within 0.03 or within 0.02 of a refractive index of the layer 810**. The refractive index is determined at a wavelength of 587.6 nm (spectral line from helium source), unless specified differently.

The region 839 of the polymeric layer 810 can optionally be the entire polymeric layer 810. For example, a layer or film (e.g., layer or film 140) can be laminated to the polymeric layer 810 prior to removing the conductive layer (e.g., conductive layer 150 depicted in FIG. 3B). The additional layer or film can provide the desired structural integrity when the micropatterns of material 830 and traces 826 extend throughout the polymeric layer 810.

Any of the patterned articles described herein, may further include additional layers or films. For example, a patterned article can include a polymeric layer defining a plurality of through openings therein, where for each through opening in at least a first sub-plurality of the through openings, a metallic body is disposed in the through opening, and where the patterned article further includes an optical film and where the polymeric layer is disposed on the optical film.

Figure 13:
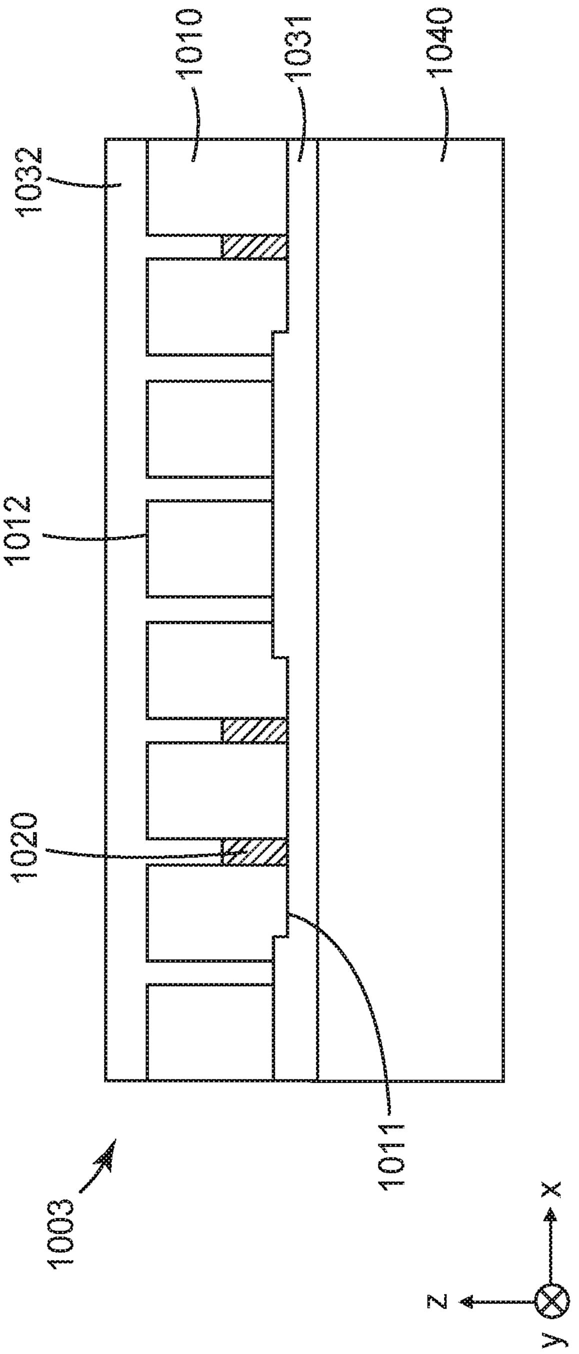
FIG. 13 is a schematic cross-sectional view of an illustrative patterned article including a polymeric layer disposed on an optical film.

FIG. 13 is a schematic cross-sectional view of a patterned article 1003 including a polymeric layer 1010 disposed on an optical film 1040, according to some embodiments. In some embodiments, the patterned article 1003 includes an optional dielectric layer 1031 disposed between the polymeric layer 1010 and the optical film 1040. In some embodiments, as described further elsewhere herein, the patterned article 1003 includes an optional dielectric layer 1032 disposed on the polymeric layer 1010 opposite the optical film 1040. The polymeric layer 1010 defines a plurality of through openings therein, where for each through opening in at least a first sub-plurality of the through openings, a metallic body 1020 is disposed in the through opening. The metallic body 1020 may have sidewall(s) extending toward or to, but not past, the major surface of the polymeric layer 1010 facing toward or away (as schematically illustrated) from the optical film 1040.

The optical film 1040 may be laminated to the polymeric layer 1010 or to the dielectric layer 1031 using an optically clear adhesive or the dielectric layer 1031 may be an optically clear adhesive. The optical film 1040 may be disposed (directly or indirectly) on major surface 1011 of the polymeric layer 1010 as illustrated in FIG. 13 or may be disposed (directly or indirectly) on the major surface 1012 of the polymeric layer 1010 as illustrated in FIG. 3B for layer or film 140 which may be an optical film. In some embodiments, an optical film is disposed on each side of the polymeric layer 1010. In some embodiments, the optical film 1040 (and/or the layer or film 140) is or includes one or more of a window film, a textured film, a patterned film, a graphic film, an infrared reflective film, or a retroreflector. Useful optical films include those described in U.S. Pat. Appl. Publ. Nos. 2017/0248741 (Hao et al.), 2015/0285956 (Schmidt et al.), 2010/0316852 (Condo et al.), 2016/0170101 (Kivel et al.), 2014/0204294 (Lv), 2014/0308477 (Derks et al.), 2014/0057058 (Yapel et al.), 2005/0079333 (Wheatley et al.), 2002/0012248 (Campbell et al.), and 2010/0103521 (Smith et al.), for example.

EXAMPLES

Isolated patterned metallic bodies were formed and transferred to a film.

These examples are merely for illustrative purposes only and are not meant to be limiting on the scope of the appended claims. All parts, percentages, ratios, etc. in the examples and the rest of the specification are by weight, unless noted otherwise. The following abbreviations are used herein: ml=milliliter, m=meter, um=micrometer, nm=nanometer, "=inch, mm=millimeter, $m^2$=meters squared, cm=centimeter, m/min=meters per minute, hrs=hours, lbs=pounds, kN=kilo newtons, MHz=Mega Herts, SCCM=standard cubic centimeters per minute, Pa=pascal, m Torr=millitorr, ° C.=Centigrade, min=minute, s=seconds.

Resin A Preparation Materials

| Description | Trade Designation or Component Name | Source |
|---|---|---|
| Urethane acrylate oligomer | PHOTOMER 6210 | IGM Resins, Charlotte, NC |
| 1,6-Hexandiol diacrylate | SR238 | Sartomer Americas, Exton, PA |
| Trimethylopropane triacrylate | SR351 | Sartomer Americas, Exton, PA |
| Diphenyl(2,4,6-trimethylbenzoyl)phosphine oxide | IRGACURE TPO | BASF, Florham Park, NJ |

Resin A was prepared by combining and mixing PHOTOMER 6210, SR238, SR351, and IRGACUR TPO in weight ratios of 60/20/20/0.5. This mixture was blended by warming to approximately 50° C. and mixing for 12 hours on a roller mixer. The mixture appeared homogeneous after mixing and warming.

Tooling Preparation

A master tool was prepared that was laser ablated according to the procedures described in U.S. Pat. No. 6,285,001 (Fleming et al.) to form a tool with a negative of the desired design (female). The mask pattern used in the laser ablation process was generally as shown in FIGS. 10A-10B. The four rectangular pads of FIG. 10A each had dimensions of 1.25 mm by 1.74 mm and were arranged with a center to center spacing of 4.236 mm. The lines connecting the rectangular pads had an 0.3 mm width. The elements including the four rectangular pads were arranged in a two-dimensional array with a pitch of 16.944 mm along the y-direction of FIGS. 10A-10B and a pitch of 4.236 mm along the x-direction of FIGS. 10A-10B. The master tool was then plated with nickel using conventional techniques (as generally described in U.S. Pat. No. 9,878,507 (Smith et al.), for example) for forming a negative master tool (male). This tool was again plated to produce the negative of the pattern yielding a female nickel tool.

UV Transparent Tool Preparation

A Rucker PHI 400 ton (City of Industry, CA) press was used to compression mold a 0.89 mm (0.035 inch) thick POLYPROPYLENE NATURAL, from Plastics International, Eden Prairie, MN sheet into the female nickel tool.

The female nickel tool was 12"×12" (30.5 cm×30.5 cm) in size.

Conditions for the Rucker press were:

Low pressure setting 14,000 lbs (62 kN), starting at 27° ° C. temperature

Increased the platen temperature to 157° C., which took 7 min and 50 seconds

Increased the pressure to 80,000 lbs (356 kN)

After 9 min and 50 seconds from starting or 2 minutes at high pressure, cooling water was turned on After from starting 22 min and 30 seconds the press was opened Surface Coating on UV Transparent Tool A silicon containing layer was applied to the microstructured surface of the UV Transparent Tool using a parallel plate capacitively coupled plasma reactor. The reactor chamber has a cylindrical powered electrode with a surface area of 0.34 $m^2$. After attaching the tool to the rotating drum electrode, the reactor chamber was pumped down to a base pressure of less than 1.3 Pa (1 mTorr). Oxygen was introduced into the chamber at a flow rate of 600 SCCM. Treatment was carried out by coupling RF power into the reactor at a frequency of 13.56 MHz and an applied power of 500 watts for 60 s. A second step resulting in a deposited thin film on the microstructure was accomplished by stopping the flow of oxygen and evaporating and transporting Hexamethyldisiloxane (HMDSO, available from Sigma-Aldrich) into the system at 120 SCCM. Treatment was carried out using a plasma enhanced CVD method by coupling RF power into the reactor at a frequency of 13.56 MHz and an applied power of 600 watts for 80 s. Following the completion of the second step, a second line of HMDSO was opened to the chamber in addition to the 120 SCCM of HMDSO. The combined flow rates resulted in a chamber pressure of 4.1 mTorr. Treatment was carried out by coupling RF power into the reactor at a frequency of 13.56 MHz and an applied power of 200 watts for 40 s. The HMDSO flows were stopped. Next oxygen was introduced into the chamber at a flow rate of 600 SCCM with treatment carried out by coupling RF power into the reactor at a frequency of 13.56 MHz and an applied power of 500 watts for 45 s The process conditions yielded a surface coating thickness of <200 nm. For each step, RF power (watts) was applied to the electrode to generate the plasma after the stated gas flow had stabilized. Following completion of the plasma treatment, the RF power and gas supplies were stopped, and the chamber was vented to the atmosphere. The tool was removed from the chamber and immersed in 3M NOVEC 2202 (available from 3M Company, St. Paul, MN) for 30 seconds and removed to allow the solvent to evaporate, then thermally cured in an air oven at 60° ° C. overnight (approximately 20 hrs.).

Replication Procedure

A 6"×6" (15.2 cm×15.2 cm) piece of clean aluminum foil, was placed on a press plate (chromed copper plate), 0.5 ml of Resin A was dispensed in the middle of the aluminum foil. Then a 4.5"×4.5" (11.4 cm×11.4 cm) piece of the surface coated UV Transparent Tool was placed with the tool pattern facing the resin. Another press plate was then placed on top of the UV Transparent Tool. This stack was then placed in a press (Devin Mfg., Inc. Arcade, New York, model LP500). A 13.8 cm×13.8 cm, 3.7 cm thick metal plate stiffener was set on the base of the press, the stack was placed on this so that it was centered, and another 13.8 cm×13.8 cm, 3.7 cm thick metal plate stiffener was placed on top of the stack, which was all centered under the press piston. 9,000 lbs (40 kN) was applied to the stack for 3 minutes to allow Resin A to flow and produce very thin lands under the male features of the UV Transparent Tool. After 3 minutes the pressure was released, and the aluminum foil/Resin A/UV Transparent Tool were removed as a stack and immediately run through a UV processor (RPC Industries. Hayward. CA (USA) model QC 120233AN) with two D bulb (Heraeus Nobelight Fusion UV Inc., Gaithersburg, MD) at 16.7 m/minute twice under a nitrogen purge. The power setting was 'normal'. The UV Transparent Tool was removed. The cured resin on the aluminum foil was then plasma etched to expose the aluminum foil in the regions where the very thin lands of cured Resin A made by the male features of the UV Transparent Tool were located. The etching was performed with the following procedure. A reactor chamber was pumped down to a base pressure of less than 1.3 Pa (1 mTorr). A gas mixture of 800 SCCM Oxygen+200 SCCM C6F14 was introduced into the chamber and etching was carried out by coupling RF power into the reactor at a frequency of 13.56 MHz and an applied power of 1000 watts for 3600 seconds. Following completion of the plasma etch, the RF power and gas supply were stopped and the chamber was vented to the atmosphere following three O2 purge steps (introduce 1000 SCCM into chamber, run RF power at 500 watts for 2 minutes, turn off O2 and allow pressure to pump back down to 1 mTorr).

The etched sample was then copper plated. Only in the areas of the pattern with exposed aluminum were plated. The copper was 10 um thick. The other areas on the aluminum foil were masked by the remaining Resin A. Next a 75 um thick polycarbonate film (LUPILON, Mitsubishi Gas Chemical Company, Inc., Tokyo, Japan) was laminated to the copper side of the sample using 3M 8146 optically clear adhesive (3M Company, St. Paul, MN). This stack was then delaminated from the aluminum foil, which resulted in electrically isolated copper patterns on the adhesive/polycarbonate film surface.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A patterned article comprising a polymeric layer comprising opposing first and second major surfaces and defining a plurality of through openings therein, wherein for each through opening in at least a first sub-plurality of the through openings: a metallic body is disposed in the through opening, the metallic body having a first outermost surface, an opposite second outermost surface and at least one lateral sidewall extending therebetween, the first outermost surface of the metallic body substantially flush with the first major surface of the polymeric layer, each lateral sidewall extending from the first outermost surface of the metallic body toward or to, but not past, the second major surface of the polymeric layer, the metallic body being substantially coextensive with the through opening in at least one cross-section parallel to the polymeric layer, wherein the metallic bodies are electrically isolated from one another, and wherein for each through opening in a second sub-plurality of the through openings, no metallic body is disposed in the through opening, each through opening in the first sub-plurality of the through openings having a first length between the first and second major surfaces, each through opening in the second sub-plurality of the through openings having a second length between the first and second major surfaces, the first and second lengths being different.

2. The patterned article of claim 1, wherein for each metallic body in at least a majority of the metallic bodies, the second outermost surface of the metallic body is substantially flush with the second major surface of the polymeric layer.

3. The patterned article of claim 1, wherein for each metallic body in at least a majority of the metallic bodies, the second outermost surface of the metallic body is disposed between the first and second major surfaces of the polymeric layer.

4. The patterned article of claim 3, wherein for each metallic body in the majority of the metallic bodies and for each corresponding through opening, a portion of the through opening between the second outermost surface of the metallic body and the second major surface of the polymeric layer is at least partially filled with a polymeric material.

5. The patterned article of claim 1, wherein the first major surface of the polymeric layer is structured.

6. The patterned article of claim 5, wherein the first major surface of the polymeric layer comprises a plurality of substantially planar first and second portions, the first and second portions parallel to, but not coplanar with, one another, wherein each through opening in the first sub-plurality of the through openings extends from one of the second portions of the first major surface to the second major surface, and each through opening in the second sub-plurality of the through openings extends from one of the first portions of the first major surface to the second major surface.

7. The patterned article of claim 5, wherein the first major surface comprises a regular array of structures.

8. The patterned article of claim 1, wherein the metallic bodies define an antenna.

9. The patterned article of claim 8, wherein the antenna comprises a retrodirective antenna array.

10. The patterned article of claim 1, wherein at least some of the metallic bodies comprise a micropattern of metallic traces, the micropattern of metallic traces having an open area fraction in a range of 80% to 99.95%.

11. The patterned article of claim 10, wherein each metallic trace in at least a majority of the metallic traces in the micropattern extends along a longitudinal direction of the metallic trace, has a width W along a width direction orthogonal to the longitudinal direction and to a thickness direction of the polymeric layer, and has a thickness T along the thickness direction, T/W being at least 0.8.

12. The patterned article of claim 11, wherein T/W is at least 2.

13. The patterned article of claim 11, wherein T/W is at least 5.

14. A patterned article comprising a unitary polymeric layer disposed on a conductive layer, the unitary polymeric layer comprising a first major surface facing the conductive layer and an opposing second major surface, the unitary polymeric layer defining a plurality of through openings therein, wherein for each through opening in at least a first sub-plurality of the through openings: a unitary metallic body is disposed in the through opening, the unitary metallic body comprising a least one lateral sidewall, each lateral sidewall extending from the conductive layer toward or to, but not past, the second major surface of the unitary polymeric layer, the unitary metallic body being substantially coextensive with the through opening in at least one cross-section parallel to the unitary polymeric layer, the unitary metallic body filling at least 10% of a volume of the through opening, wherein the unitary metallic bodies are electrically connected to one another only by virtue of the conductive layer, and wherein for each through opening in a second sub-plurality of the through openings, no metallic body is disposed in the through opening, each through opening in the first sub-plurality of the through openings having a first length between the first and second major surfaces, each through opening in the second sub-plurality of the through openings having a second length between the first and second major surfaces, the first and second lengths being different.

15. The patterned article of claim 14, wherein the conductive layer is disposed on, and substantially conforms to, a structured major surface of a substrate.

16. The patterned article of claim 15, wherein the structured major surface of the substrate comprises a regular array of structures.

17. The patterned article of claim 14, wherein at least some of the unitary metallic bodies comprise a micropattern of metallic traces, the micropattern of metallic traces having an open area fraction in a range of 80% to 99.95%, wherein each metallic trace in at least a majority of the metallic traces in the micropattern extends along a longitudinal direction of the metallic trace, has a width W along a width direction orthogonal to the longitudinal direction and to a thickness direction of the polymeric layer, and has a thickness T along the thickness direction, T/W being at least 0.8.

18. The patterned article of claim 17, wherein T/W is at least 2.

19. The patterned article of claim 17, wherein T/W is at least 5.

20. A process for making a patterned article, the process comprising, in sequence:

providing a conductive layer;

forming a polymeric layer on the conductive layer, the polymeric layer comprising opposing first and second major surfaces and defining a plurality of through openings therein, the plurality of through openings comprising first and second sub-pluralities of the through openings, wherein the first major surface of the polymeric layer comprises a plurality of substantially planar first and second portions, the first and second portions parallel to, but not coplanar with, one another, wherein each through opening in the first sub-plurality of the through openings extends from one of the second portions of the first major surface to the second major surface, and each through opening in the second sub-plurality of the through openings extends from one of the first portions of the first major surface to the second major surface;

depositing a metallic body in each through opening in the first sub-plurality, but not the second sub-plurality, of the through openings such that the metallic body contacts the conductive layer; and removing the conductive layer resulting in the metallic bodies being electrically isolated from one another.

* * * * *